United States Patent
Jensen

(10) Patent No.: US 9,416,768 B2
(45) Date of Patent: Aug. 16, 2016

(54) REINFORCED AIRFOIL SHAPED BODY

(75) Inventor: Find Mølholt Jensen, Viby Sjælland (DK)

(73) Assignee: BLADENA ApS, Ringsted (DK)

( * ) Notice: Subject to any disclaimer, the term of this patent is extended or adjusted under 35 U.S.C. 154(b) by 898 days.

(21) Appl. No.: 13/512,656

(22) PCT Filed: Nov. 30, 2010

(86) PCT No.: PCT/EP2010/068521
§ 371 (c)(1),
(2), (4) Date: Jul. 18, 2012

(87) PCT Pub. No.: WO2011/067248
PCT Pub. Date: Jun. 9, 2011

(65) Prior Publication Data
US 2012/0273617 A1  Nov. 1, 2012

(30) Foreign Application Priority Data
Dec. 2, 2009  (EP) .................................. 09177783

(51) Int. Cl.
*F03D 1/06* (2006.01)

(52) U.S. Cl.
CPC ......... *F03D 1/065* (2013.01); *F05B 2280/6003* (2013.01); *F05B 2280/6013* (2013.01);
(Continued)

(58) Field of Classification Search
CPC .......... B64C 1/065; B64C 3/18; B64C 3/182; B64C 3/185; B64C 3/187; B64C 11/20; B64C 11/24; B64C 27/473; B64C 27/4736; F03D 1/065; F03D 1/0675; F03D 1/0683; F04D 29/388
See application file for complete search history.

(56) References Cited

U.S. PATENT DOCUMENTS 2,410,609 A * 11/1946 Pecker ........................ 244/123.9
2,430,431 A * 11/1947 Lanier ........................... 244/207
(Continued)

FOREIGN PATENT DOCUMENTS

| CA | 1151072 | 7/1981 |
|----|---------|--------|
| CN | 101029629 A | 9/2007 |

(Continued)

OTHER PUBLICATIONS

Jensen, et al.; Full Scale Test of a SSP 34m box girder 1.Data Report; Appendix E; Riso National Laboratory for Sustainable Energy; Mar. 2008; pp. 78-150; Riso-R-1622 (EN); Technical University of Denmark; Roskilde, Denmark.

(Continued)

*Primary Examiner* — Igor Kershteyn
*Assistant Examiner* — Christopher R Legendre
(74) *Attorney, Agent, or Firm* — Lee & Morse, P.C.

(57) ABSTRACT

The present invention relates to an airfoil shaped body with a leading edge and a trailing edge extending along the longitudinal extension of the body and defining a profile chord, the airfoil shaped body comprising an airfoil shaped facing that forms the outer surface of the airfoil shaped body and surrounds an internal volume of the body, a distance member that is connected to the facing inside the body and extends from the facing and into the internal volume of the body, and at least one reinforcing member that operates in tension for reinforcing the facing against inward deflections and that is connected to the facing inside the internal volume of the body at the same side of the profile chord as the connection of the distance member to the facing and to the distance member at a distance from the facing.

19 Claims, 31 Drawing Sheets

Figure 1:
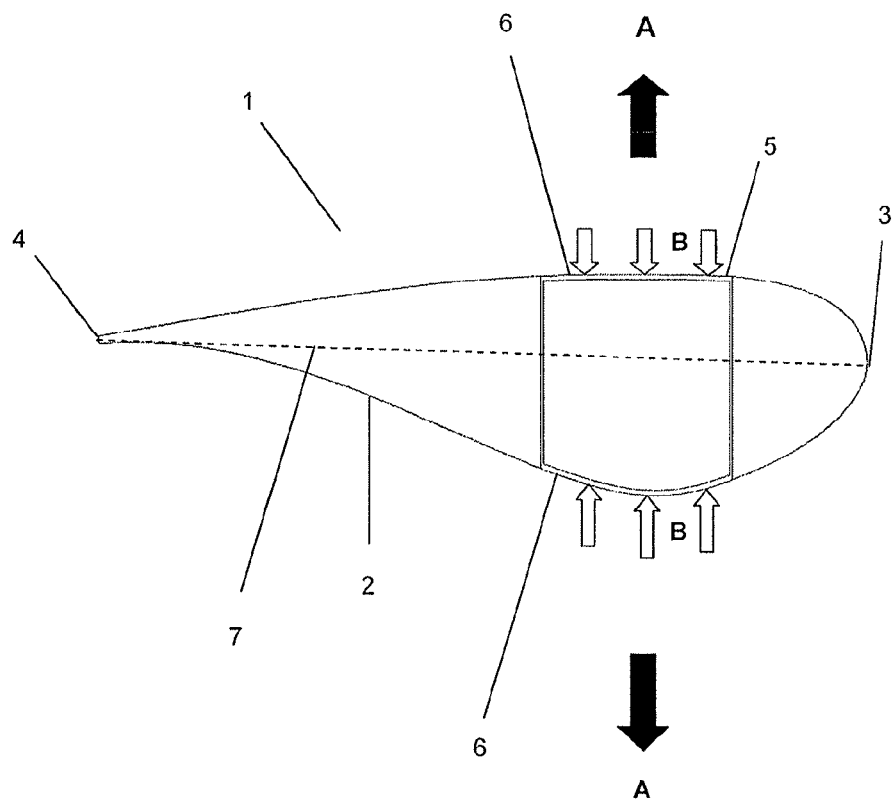

(52) U.S. Cl.
CPC ....... F05B2280/702 (2013.01); F05C 2253/04 (2013.01); F05C 2253/16 (2013.01); F05C 2253/22 (2013.01); Y02E 10/721 (2013.01); Y10T 29/49826 (2015.01); Y10T 29/49863 (2015.01); Y10T 428/24612 (2015.01)

(56) References Cited

U.S. PATENT DOCUMENTS

| | | | |
|---|---|---|---|
| 4,295,790 A | 10/1981 | Eggert, Jr. | |
| 4,305,699 A | 12/1981 | Martinelli | |
| 4,494,910 A | 1/1985 | Hahn et al. | |
| 4,530,197 A * | 7/1985 | Rainville | B21D 47/00 228/157 |
| 4,643,646 A | 2/1987 | Hahn et al. | |
| 4,976,587 A | 12/1990 | Johnston et al. | |
| 5,375,324 A | 12/1994 | Wallace et al. | |
| 5,401,138 A | 3/1995 | Mosiewicz | |
| 5,534,354 A | 7/1996 | Gregg et al. | |
| 6,457,943 B1 | 10/2002 | Olsen et al. | |
| 6,974,633 B2 * | 12/2005 | Garratt | B21B 1/08 148/415 |
| 7,179,059 B2 | 2/2007 | Sorensen et al. | |
| 7,198,471 B2 | 4/2007 | Gunneskov et al. | |
| 7,901,188 B2 | 3/2011 | Llorente Gonzalez et al. | |
| 7,954,763 B2 * | 6/2011 | Kulesha | 244/123.1 |
| 8,454,318 B2 * | 6/2013 | Jensen | 416/226 |
| 8,485,786 B2 * | 7/2013 | Jensen | 416/233 |
| 8,490,362 B2 * | 7/2013 | Kulesha | 52/636 |
| 8,632,312 B2 * | 1/2014 | Jensen et al. | 416/233 |
| 8,961,715 B2 * | 2/2015 | Bray | B64C 3/182 148/439 |
| 2003/0116262 A1 | 6/2003 | Stiesdal et al. | |
| 2006/0175731 A1 | 8/2006 | Bech et al. | |
| 2007/0040294 A1 | 2/2007 | Arelt | |
| 2007/0110584 A1 | 5/2007 | Stommel | |
| 2007/0110585 A1 | 5/2007 | Bonnet | |
| 2007/0140861 A1 | 6/2007 | Wobben | |
| 2007/0189903 A1 | 8/2007 | Eyb | |
| 2007/0217918 A1 | 9/2007 | Baker et al. | |
| 2008/0069699 A1 | 3/2008 | Bech | |
| 2008/0245927 A1 * | 10/2008 | Kulesha | 244/123.1 |
| 2008/0304971 A1 | 12/2008 | Liebmann | |
| 2008/0310964 A1 | 12/2008 | Llorente Gonzalez et al. | |
| 2009/0208341 A1 | 8/2009 | Llorente Gonzalez et al. | |
| 2009/0324412 A1 | 12/2009 | Roorda | |
| 2010/0051752 A1 * | 3/2010 | Meyer et al. | 244/219 |
| 2010/0062238 A1 | 3/2010 | Doyle et al. | |
| 2010/0092300 A1 | 4/2010 | Jensen et al. | |
| 2012/0273617 A1 * | 11/2012 | Jensen | 244/123.1 |

FOREIGN PATENT DOCUMENTS

| | | | |
|---|---|---|---|
| DE | 706014 C * | 5/1941 | |
| DE | 2923463 A1 | 12/1980 | |
| DE | 3037677 A1 | 5/1982 | |
| DE | 4225599 A1 | 2/1994 | |
| DE | 4428730 A1 | 2/1996 | |
| DE | 20320714 U1 | 2/2005 | |
| EP | 0061567 A2 | 2/1982 | |
| EP | 0062737 A1 | 2/1982 | |
| EP | 0258926 A1 | 3/1988 | |
| EP | 0391702 A1 | 10/1990 | |
| EP | 1184566 A1 | 3/2002 | |
| EP | 1310351 A1 | 5/2003 | |
| EP | 1522724 A1 | 4/2005 | |
| EP | 1584817 A1 | 10/2005 | |
| EP | 1754589 A1 | 2/2007 | |
| EP | 1785621 A2 | 5/2007 | |
| EP | 1808598 A1 | 7/2007 | |
| EP | 1878915 A2 | 1/2008 | |
| EP | 1880833 A1 | 1/2008 | |
| FR | 471195 A * | 10/1914 | B64C 3/185 |
| FR | 568874 A | 4/1924 | |
| FR | 644675 A * | 11/1928 | |
| FR | 701140 A | 3/1931 | |
| FR | 703261 A | 4/1931 | |
| FR | 793334 A * | 1/1936 | |
| FR | 2286953 A1 | 4/1976 | |
| FR | 2459381 A1 | 1/1981 | |
| FR | 2898865 A1 | 9/2007 | |
| GB | 319299 | 9/1929 | |
| GB | 367049 A * | 2/1932 | B64C 3/00 |
| GB | 382979 A * | 11/1932 | |
| GB | 871625 A * | 6/1961 | |
| GB | 909004 | 10/1962 | |
| GB | 2042093 A | 9/1980 | |
| GB | 2062120 A | 5/1981 | |
| GB | 2115075 A | 9/1983 | |
| JP | 61-192866 A | 8/1986 | |
| JP | 62-282176 A | 12/1987 | |
| JP | 2003-214322 A | 7/2003 | |
| JP | 2003-293937 A | 10/2003 | |
| NL | 9100816 A | 12/1992 | |
| WO | WO 00/14405 | 3/2000 | |
| WO | WO 01/46582 A2 | 6/2001 | |
| WO | WO 01/46582 A3 | 6/2001 | |
| WO | WO 01/98653 A1 | 12/2001 | |
| WO | WO 03/008800 A1 | 1/2003 | |
| WO | WO 03/087572 A1 | 10/2003 | |
| WO | WO 2004/078442 A1 | 9/2004 | |
| WO | WO 2005/011964 A1 | 2/2005 | |
| WO | WO 2006/002621 A1 | 1/2006 | |
| WO | WO 2006/066593 A1 | 6/2006 | |
| WO | WO 2006/103307 A2 | 10/2006 | |
| WO | WO 2008/086805 A1 | 7/2008 | |
| WO | WO 2008/089765 A2 | 7/2008 | |
| WO | WO 2008/089765 A3 | 7/2008 | |

OTHER PUBLICATIONS

Jensen, et al.; Full Scale Test of a SSP 34m box girder 2. Data Report; Riso National Laboratory for Sustainable Energy; May 2008; pp. 1-159; Riso-R-1588 (EN); Technical University of Denmark; Roskilde, Denmark.

Nielsen; Experimental and numerical analysis of a wind turbine blade cross section under lateral load conditions; pp. 1-44; Dec. 20, 2006.

Jensen, et al.; Structural testing and numerical simulation of a 34 m composite wind turbine blade; Composite Structures; Jul. 2006; pp. 52-61; vol. 76; Elsevier.

Technical Survey Report 162778; PRV InterPat; Dec. 27, 2007; pp. 1-3; Stockholm, Sweden.

Technical Survey Report; 162779; PRV InterPat; Dec. 27, 2007; pp. 1-4; Stockholm, Sweden.

Technical Survey Report; 162780; PRV InterPat; Dec. 27, 2007; pp. 1-4 Stockholm, Sweden.

Jensen, et al.; Full Scale Test of a SSP 34m box girder 1.Data Report; Riso National Laboratory for Sustainable Energy; Mar. 2008; pp. 1-77; Riso-R-1622 (EN); Technical University of Denmark; Roskilde, Denmark.

Chinese Office action date Jan. 7, 2013 for related application CN 200980124196.2.

PCT International Search Report in DK 2008/00861, dated Feb. 20, 2009 (Jensen).

PCT International Search Report in DK 2008/00867, dated Feb. 24, 2009 (Jensen).

PCT International Search Report in 2008/0921, dated Mar. 24, 2009 (Jensen).

Notification of Transmittal of International Search Report, International Search Report and Written Opinion of the International Searching Authority in PCT/DK2009/000150 dated Sep. 9, 2009 (Jensen).

Jensen; Ultimate strength of a large wind turbine blade; Riso National Laboratory for Sustainable Energy; May 2008; pp. 1-313; Riso-PhD-34(EN); ISBN 978-87-550-3634-5, DTU BYG R-205-ISBN=9788778772831; Technical University of Denmark; Roskilde & Kgs. Lyngby, Denmark.

* cited by examiner

Prior Art

REINFORCED AIRFOIL SHAPED BODY

CROSS REFERENCE TO RELATED APPLICATIONS

This is the U.S. national phase application based on PCT Application No. PCT/EP2010/068521 filed Nov. 30, 2012, which is based on European Application 09177783.9, filed Dec. 2, 2009, the entire contents of all of which is hereby incorporated by reference.

The present invention relates to a reinforced airfoil shaped body, and in particular to an airfoil shaped body having reinforcing members inside the body extending transversal to the longitudinal direction of the airfoil shaped body and operating in tension to prevent deformation of the airfoil shaped outer surface of the airfoil shaped body during operation.

The airfoil shaped body may be, but is not limited to, a wind turbine blade, an airplane wing, a helicopter blade, etc.

A conventional wind turbine blade comprises an airfoil shaped facing, typically divided into shells, and a girder, such as a beam or a spar. The girder can be a single beam, but often two girders are used. The parts of the airfoil shaped facing extending between the two girders at opposite sides of the facing are denoted caps or cap parts. The two girders together with the cap parts, typically of increased thickness, form a so-called box profile.

Some types of wind turbine blades are designed with a spar in the form of a box profile which is manufactured separately and bonded in between prefabricated shells that form the airfoil shaped facing when assembled.

The airfoil shaped facing is typically made of a laminate of fibre reinforced plastics, fibreglass and/or other materials. Typically, the airfoil shaped facing is made of two shells that are assembled to form the facing.

During its operation, the wind turbine blade is subjected to loads at an angle to the flapwise direction. It is common to resolve this load on the blade into its components in the flapwise and edgewise direction. The flapwise direction is a direction substantially perpendicular to a transverse axis through a cross-section of the blade. The flapwise direction may thus be construed as the direction, or the opposite/reverse direction, in which the aerodynamic lift acts on the blade. The edgewise loads occur in a direction perpendicular to the flapwise direction. The blade is further subject to torsional loads which are mainly aerodynamic and inertia loads. These loads can subject the blade to harmonic motions or oscillations at the blade's torsional eigenfrequency; cf. FIG. 1 for an indication of the loads and the directions.

Figure 2:
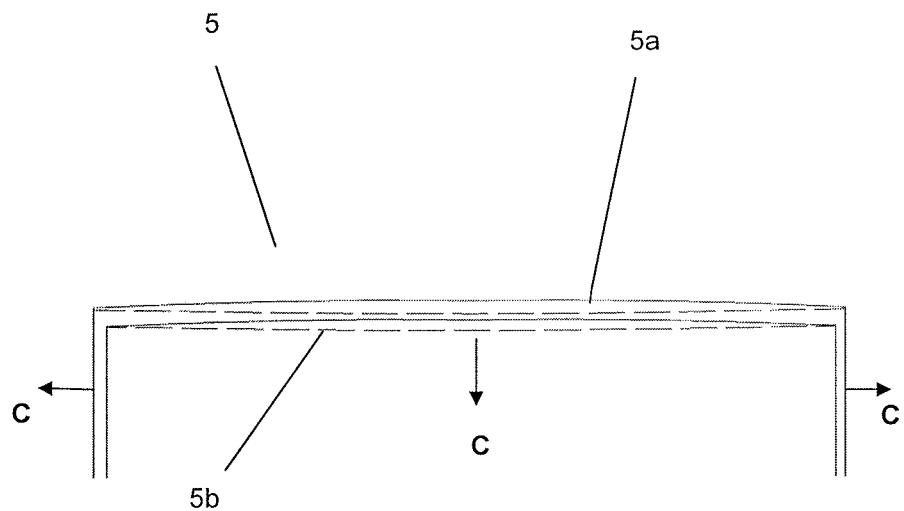
Figure 4:
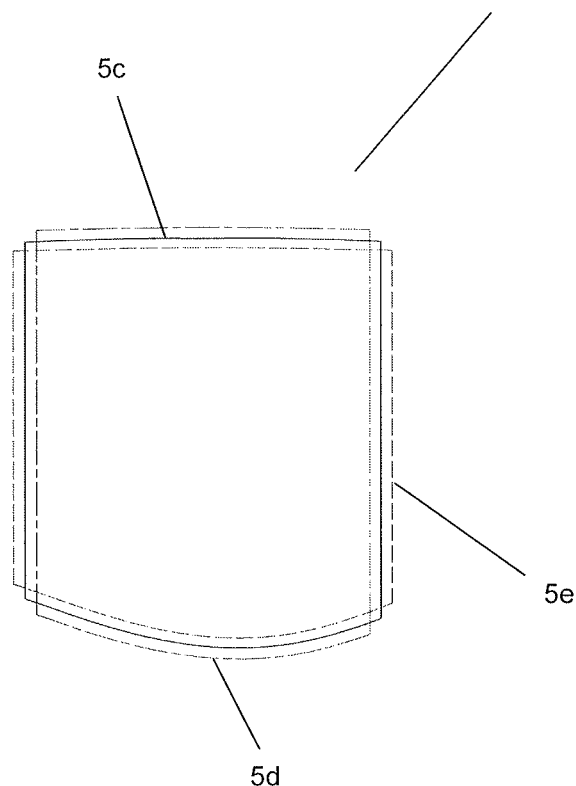

During operation, the airfoil shaped body, e.g. in the form of a wind turbine blade, is primarily loaded in the flapwise direction. The forces cause bending of the airfoil shaped body along its longitudinal extension. In case of a wind turbine blade, the body typically bends towards the tower of the wind turbine. The bending causes ovalization or flattening as illustrated in FIGS. 2 and 4 of the box profile and can also lead to buckling failure of the body.

During bending of the airfoil shaped body along its longitudinal extension, one of the caps is compressed in its longitudinal direction. When the compression exceeds a certain limit, which is dependent on the thickness, the curvature, the materials and the orientation of the materials of the cap in question, the cap is forced out of its original shape, and a buckling pattern is formed. If the flapwise load, and thereby the compression load increases further, the airfoil shaped body may suddenly collapse.

In conventional wind turbine blades, the thickness of the caps is typically increased to increase the strength of the caps primarily against bending along the longitudinal extension of the blade.

Figure 3:
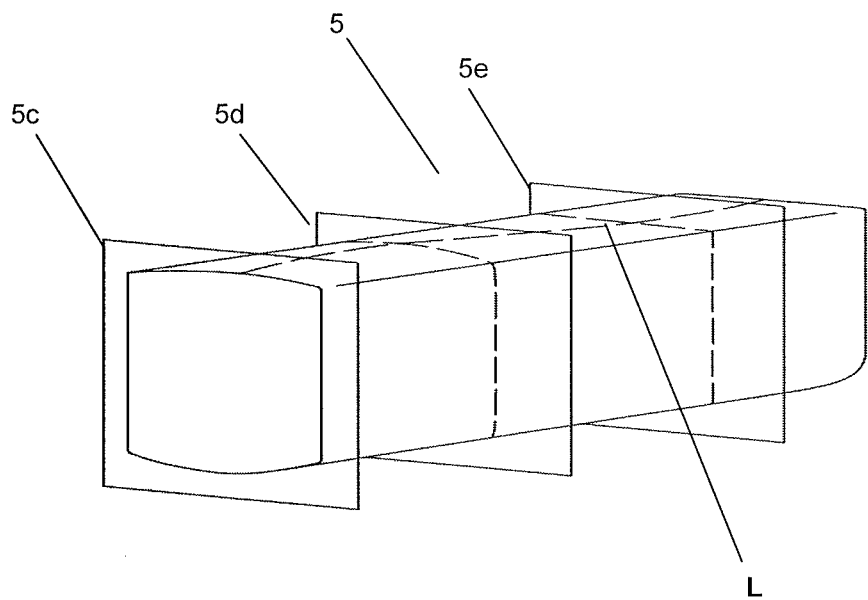

Failure of a blade is determined by several individual factors. However, one very important factor is the resistance of the caps against buckling. If or when buckling occurs, the curvature of the airfoil shaped blade's cross-section may e.g. transform as shown in FIGS. 3 and 4.

Further, in conventional wind turbine blades, ovalization caused by the crushing pressure resulting from bending along the longitudinal extension of the blade, induces a multi-axial stress condition in the material, typically laminated material, of the airfoil shaped facing. This may lead to the formation of interlaminar cracks, matrix cracking, de-lamination, skin debonding, etc., of the material and consequently weaken the construction more and more, each time the blade is loaded. The interlaminar cracks also decrease the buckling resistance of the caps and may consequently result in increased risk of buckling failure of the blade.

It is one of the objects of the present invention to provide an airfoil shaped body with an increased strength against deformation of the airfoil shape substantially without increasing the weight of the body.

Thus, an airfoil shaped body is provided with a leading edge and a trailing edge extending along the longitudinal extension of the body and defining a profile chord of the body. The profile chord is an imaginary surface that contains the leading edge and the trailing edge of the airfoil shaped body and extends therebetween along the longitudinal extension of the airfoil shaped body. In cross-section, the profile chord is a straight line connecting the leading and trailing edges of the airfoil shaped body.

The airfoil shaped body comprises an airfoil shaped facing that forms the outer surface of the airfoil shaped body and defines an internal volume of the body. A distance member is connected to the facing inside the body and extends from the facing and into the internal volume of the body. Further, at least one reinforcing member is mounted inside the airfoil shaped body, and each of the at least one reinforcing member extends transversal to the longitudinal direction or extension of the airfoil shaped body and operates in tension for reinforcing the facing against inward deflections. Each of the at least one reinforcing member is connected to the facing inside the internal volume of the body at the same side of the profile chord as the connection of the distance member to the facing. Further, each of the at least one reinforcing member is connected to the distance member at a distance from the facing.

The distance member must be capable of maintaining the distance between the inner surface of the facing and the connection of the at least one reinforcing member to the distance member and need not carry any other loads.

The distance member may be made of any suitable material and conveniently, the distance member is made of the same material as the part of the facing connected to the distance member, e.g. the cap, such as reinforced plastic, such as fibre glass.

The distance member may extend along substantially the entire extension of the airfoil shaped body.

The distance member may be connected to a single reinforcing member; or the distance member may be connected to a plurality of reinforcing members.

A plurality of distance members may be provided in the airfoil shaped body.

A plurality of distance members may be provided with a mutual lateral distance between them.

The airfoil shaped body may for example constitute a wind turbine blade in a vertical axis wind turbine, such as a Darrieus wind turbine, a wind star turbine, etc., or a wind turbine blade in a horizontal axis wind turbine, such as common modern wind turbines usually three-bladed, sometimes two-bladed or even one-bladed (and counterbalanced), etc. The airfoil shaped body may also constitute an aerofoil device or a wing used in the aeronautical industry, such as a helicopter blade, an airplane wing, etc.

The airfoil shaped body may operate not only in air flows, but also in water flows, including rivers, creeks, tidal flow, oceanic currents, wave motion, ocean wave surface currents, etc.

The facing, e.g. formed by shells, of the airfoil shaped body may comprise a composite, e.g. in the form of laminated material, such as reinforced plastic. The material may comprise fibreglass and/or carbon fibres and/or other durable and flexible materials, typically with a high strength/weight ratio. The facing may also be made of wood, such as bamboo, birch, plywood, etc., or another material based on plant fibres with high cellulose content, such as bast fibres, such as flax, jute, etc. These fibres may be used as reinforcement in a composite material, such as a reinforced plastic. The material may further comprise, at least in part, light weight metals or alloys. The facing may also be made of a combination of the above mentioned materials.

The facing may typically be of a laminate or sandwich-construction.

Each reinforcing member is connected with at least two connections inside the airfoil shaped body, i.e. with at least one first connection to the airfoil shaped facing at a lateral distance from the distance member, and with at least one second connection to the distance member at a distance from the airfoil shaped facing.

A force inwardly in the flapwise direction in the airfoil shaped body, e.g. crushing pressure, proximate the first and second connections, urges the airfoil shaped facing inwardly towards the inner volume of the airfoil shaped body. Deformation inwardly immediately leads to tension in the respective reinforcing member connected with the first and second connections, and since the respective reinforcing member has strength to provide resistance against tension, the respective reinforcing member substantially prevents deformation by inhibiting an increase of the distance between its first and second connections.

Thus, each reinforcing member desirably has a high tensional strength while each reinforcing member need not be capable of resisting compression forces. Preferably, each reinforcing member has a straight shape, such as the shape of a stretched wire, a rod, a plate, etc. If the shape of the reinforcing member is not straight, the shape of the reinforcing member could be straightened when subjected to tension which would lead to an increase of the distance between its first and second connections; and obviously, this is not desired.

Since the reinforcing member is required to have a high tensional strength only, i.e. the reinforcing member need not carry other loads; the reinforcing member is preferably thin so that its weight and cost can be kept at a minimum.

The thickness of the reinforcing member is preferably less than 10 times the maximum thickness of the facing, more preferred less than 5 times the maximum thickness of the facing, still more preferred less than 2 times the maximum thickness of the facing, yet more preferred less than 1.5 times the maximum thickness of the facing, even more preferred less than the maximum thickness of the facing, still more preferred less than 0.75 times the maximum thickness of the facing, most preferred less than 0.5 times the maximum thickness of the facing.

Preferably, each reinforcing member is pre-tensioned to a desired level ensuring that each reinforcing member is fully stretched and of a straight shape so that each reinforcing member will immediately inhibit deformation of the facing.

Preferably, at least one of the reinforcing members is further connected with at least one third connection to the airfoil shaped facing at the opposite side of the distance member of the at least one second connection and at the same side of the profile chord as the at least one second connection. Hereby, the distance member is loaded symmetrically during operation whereby the required strength of the distance member and its connection to the airfoil shaped facing is lowered.

Preferably, the connection between the reinforcing member and the distance member is located at a free end of the distance member providing the largest distance between the reinforcing member and the inner surface of the facing at the distance member.

The second and possible third connections on the inner surface of the airfoil shaped facing may in principle be positioned anywhere on the inner surface appropriate for reinforcement of the body.

The first, second, and third connections may comprise any suitable kind of joint, such as welded, glued, melted, fused or other simple mechanical connections. Each reinforcing member may be connected directly with the connections to the airfoil shaped facing or the distance member; or, the reinforcing member may comprise additional connections or connection parts configured to engage or cooperate with the connections to the inner surface of the airfoil shaped facing or the distance member. The additional connections or connection parts must be sufficiently rigid to maintain their shape when subjected to tension in order to properly cooperate with the reinforcing member to prevent an increase of the distance between the first connections and respective second and third connections.

The at least one reinforcing member cooperates with the distance member to significantly increase the overall strength of the airfoil shaped body since the resistance against ovalization and buckling is increased. Further, multi-axial stress in the laminated material is reduced or eliminated so that the resistance against formation of interlaminar cracks and matrix cracking is also increased.

Hereby, the dimensions of the material(s) used for the airfoil shaped facing may be significantly reduced due to the presence of the at least one reinforcing member as compared to conventional airfoil shaped bodies of the same strength without the at least one reinforcing member, so that the weight is lowered, and the dynamic loads on possible other parts of a unit with the airfoil shaped body is lowered, handling and transportation characteristics of the airfoil shaped body are improved, and material costs are reduced.

The airfoil shaped body may also comprise one or more girders. Wind turbine blades with one or more girders are well-known. A conventional girder has a longitudinal extension along the longitudinal extension of the blade and a transverse extension substantially perpendicular to the profile chord of the blade. The one or more conventional girders primarily strengthen the blade along the longitudinal extension of the blade. A girder may also be referred to as a web. The conventional girder or web may be constituted by any type of elongate constructional member capable of taking up loads, such as a beam or a spar, e.g. shaped as an I-profile, preferably made from fibre reinforced plastics or other suitable material. Typically, girders extend along substantially the entire length of the blade.

A girder of the airfoil shaped body may be embedded in or form part of the facing of the airfoil shaped body.

For example, at least one girder may be provided inside the airfoil shaped body connected to an inner surface of the facing of the airfoil shaped body to strengthen and reinforce the airfoil shaped body primarily along its longitudinal extension. The girder or web is an elongate constructional element capable of taking up loads, such as a beam or a spar, e.g. shaped as an I-profile or an U-profile, preferably made of fibre reinforced plastic or another suitable material. Each of the at least one girder or web may extend along substantially the entire length of the airfoil shaped body. However, the girder may be divided along the longitudinal extension of the airfoil shaped body into separate girders, e.g. for facilitating handling or transportation.

The airfoil shaped body may comprise two girders. The two girders together with the parts of the airfoil shaped facing extending between the two girders form a so-called box profile. In the following, the top and bottom of the box profile are denoted the caps. Typically, the caps have an increased thickness compared to the remaining parts of the facing.

The airfoil shaped body may comprise a box girder or a box beam.

The box girder or box beam may be adapted to accommodate various types of equipment on the inner sides thereof, e.g. measuring instrumentation, control mechanisms and/or systems and servo motors for powering mechanisms on or within the airfoil shaped body.

The sides of the at least one girder may vary in thickness along its longitudinal or transverse extensions, or both extensions, and the shape or the perimeter length of the cross-section of the girder, or both, may also vary along its longitudinal extension.

The cross-section of the box girder or box beam may have any polygonal shape such as substantially rectangular, square, triangular, etc., shape, or the cross-section may be circular, oval, elliptical, etc. Preferably, the cross-section of the box girder or box beam is rectangular or substantially square.

The distance member may be connected to the facing at one of the caps, preferably at or near a central longitudinal axis of the respective cap. Preferably, the distance member is connected to an inner surface of a cap with a large radius of curvature, such as a substantially planar cap. Correspondingly, each of, or at least one of, the at least one reinforcing member may be connected to the inner surface of the airfoil shaped body at or near one of the caps, and preferably at or near an edge of one of the caps, e.g. of a box profile. For example, each of, or at least one of, the at least one reinforcing member may be connected to the cap together with the respective girder.

The connection of a reinforcing member to—or near to—one of the caps, inhibits ovalization and buckling of the respective cap.

The at least one reinforcing member may have the shape of a bar or a rod and may have any suitable cross-section, for example a substantially round or polygonal cross-section, such as substantially rectangular, square, triangular, circular, oval, elliptical, etc.; however, the cross-section is preferably rectangular and flat. The reinforcing member may be solid or hollow or any suitable combination thereof. Alternatively, the reinforcing member may comprise wire, rope, cord, thread or fibres. They may be applied individually or may be applied as a number of individual elements together forming a "thicker" member.

The reinforcing member may be made of any suitable material. Fibre reinforced plastic is presently preferred.

The reinforcing member may comprise fibres of very high stiffness and strength such as, glass fibres, carbon fibres, aramid fibres, polyethylene fibres, PBO fibres (polypheylene benzobisoxqazole), etc.

The reinforcing member may also be made of wood, such as bamboo, birch, plywood, etc, or another material based on plant fibres with high cellulose content, such as bast fibres, such as flax, jute, etc. These fibres may be used as reinforcement in a composite material, such as a reinforced plastic, or may be used in the form of wires or rods.

The reinforcing member may also be made of steel, light metal alloys, etc.

The reinforcing member may further be made of a combination of the above mentioned materials.

The reinforcing member may for example be made of a shrinkable material, e.g. a shrinkable plastic material, so that the reinforcing member may be pre-tensioned, e.g. by heating of the member, when mounted in its intended position within the airfoil shaped body.

A reinforcing member with a longitudinal extension between its first and second connections, such as a reinforcing member having the shape of a rod, preferably extends along the edgewise direction of the airfoil shaped body substantially perpendicular to the longitudinal direction or extension of the airfoil shaped body; however, the longitudinal extension of the reinforcing member may form a different angle with the longitudinal extension of the airfoil shaped body, e.g. for ease of manufacture, for compensating torsional deflections during operation, etc.

The at least one reinforcing member may have parts shaped as a plate. The plate shaped part of the reinforcing member may be solid or hollow or any suitable combination thereof.

The plate shaped material may comprise any of metal, metal alloy, wood, plywood, veneer, glass fibre, carbon fibre and other suitable materials such as e.g. one or more composite materials. The plate shaped part of the reinforcing member may further be provided as a netting or a web comprising one or more wires, ropes, cords, threads or fibres. The plate shaped part of the reinforcing member may comprise a textile or a fabric material. The fabric material may be manufactured from materials such as, but not limited to, carbon fibres, or aramid fibres, or glass fibres, etc., thus providing a high strength and a low weight.

The mentioned materials may also be combined to any construction. Thus, the at least one reinforcing member may be a laminate or a sandwich construction.

The plate shaped part of the reinforcing member may comprise one or more cut-outs. The cut-outs may be made in any suitable kind of pattern. The cut-outs decrease material cost and weight. Furthermore, the cut-outs may provide passage for any additional wiring or other equipment and also reduce the overall weight.

The at least one reinforcing member and the distance member may be fixedly interconnected. The interconnection may comprise any suitable kind of joint such as welded, glued, melted or fused connections as previously described.

The at least one reinforcing member and the distance member may be releasably interconnected. The releasable interconnection may comprise any suitable kind of joint such as a snap-fit, press-fit, groove-and-tongue connection or other simple mechanical connection. A releasable interconnection may be used to provide an airfoil shaped body with an increased degree of flexibility.

A volume defined between the at least one reinforcing member and an inner surface of the airfoil shaped facing may at least partly be filled with a filler material. The filler material may comprise one or more substances. The substances may have different physical, chemical or mechanical properties and may be mixed so as to provide one or more specific characteristics such as insulating power, stiffness, low weight, high or low conductivity etc. For example, expansion of the filler material may provide pre-tensioning of respective reinforcing member(s). Such filler material may comprise foam made of a mixture of polyurethane and isocyanate that expands upon mixing.

Preferably, the filler material may be a foamed material characterised by e.g. low weight and convenient working properties for forming a suitable surface that is easily further processed e.g. by further laminating with fibres or fibre tapes. Particularly, the foamed material may comprise a PVC or PVC-based material particularly capable of absorbing pressure forces. Particularly, the foamed material may be provided as a prefabricated and/or pre-shaped element with a first surface substantially corresponding to the curvature of the airfoil shaped facing along the inner surface thereof, and a second surface being substantially plane or flat. The second surface of the pre-shaped foamed element may then form an even and aligned basis for a plate shaped part of the reinforcing member. The provision of a pre-shaped foamed element can be especially advantageous since the foamed element then may act as a mould or form for the positioning of the reinforcing member and for the overall construction of the relevant part. This means that the need for a custom-made mould, e.g. of glass fibre for constructing the relevant part can be eliminated, thus reducing manufacturing costs of the relevant part.

The filler material, e.g. a foamed element, e.g. a pre-shaped foamed element, may constitute the distance member.

The filler material may also or instead comprise a fluid or gaseous material being e.g. injected, sprayed or blow moulded into the space. The fluid or gaseous material may be of a kind that hardens when e.g. exposed to air. In embodiments comprising a fluid or gaseous filler material relevant means may be provided in connection with e.g. the reinforcing member for retaining such material.

At least one of the caps, preferably the cap with the largest radius of curvature in a transversal cross-section of the body, may be manufactured as a separate cap part. The separate cap part may be manufactured in an individual manufacturing process and then provided for connection in the airfoil shaped body. The outer surface of the separate cap part is substantially aligned with the facing such that the outer surface of the airfoil shaped body has a smooth airfoil shaped surface when assembled.

The separate cap part may form a single member extending substantially along the length of the airfoil shaped body, or it may be divided into shorter sections facilitating easier handling and assembly.

A plurality of reinforcing members or the material of a single reinforcing member may be arranged in such manner that during flapwise loading of the airfoil shaped body; the plurality of reinforcing members, or the material, is taking up shear forces in the surface of the airfoil shaped body. The shear forces will twist the airfoil shaped body, and thereby couple bending and torsion of the airfoil shaped body. This effect may preferably, but not exclusively, be achieved by arranging the plurality of reinforcing members at angles of less than 90° in relation to the longitudinal extension of the airfoil shaped body. If a plate of fibre reinforced materials or a textile is used, the fibre directions must be less than 90°, but more than 0° in relation to the longitudinal axis of the airfoil shaped body.

The coupling of the bending and the torsion can be used to change the angle of attack of the airfoil shaped body during wind gust or similar extreme aerodynamic conditions. The unloading of the airfoil shaped body will decrease the maximal stresses in the airfoil shaped body and thereby decrease the weight.

The coupling of the bending and the torsion may also optimize the power output from the airfoil shaped body.

At least one reinforcing member may be equipped with, or may consist of, active piezoelectric installations, etc., that may be activated by means of voltage, current, electric or magnetic field, whereby the length of the reinforcing member changes and/or stresses are imposed on the member. By this it is possible to change the curvature of the profile's surface and thereby change the aerodynamic properties of the profile. The reinforcing member(s) may be equipped with or may consist of passive installations, such as dampers, for further suppression of deformation and oscillation of the airfoil shaped body. With these installations it is possible to optimize the performance of the airfoil shaped body.

The airfoil shaped body may further comprise one or more connectors for connecting the airfoil shaped body with another construction. For example, when the airfoil shaped body is a wind turbine blade, the blade is connected to the hub of the wind turbine.

The airfoil shaped body may further comprise other internal or external equipment suitable for use in the relevant structure they become a part of.

The airfoil shaped body may also constitute a part of a load-bearing construction, such as the tower of a wind turbine.

Further, a method for manufacturing an airfoil shaped body with at least one reinforcing member is provided, comprising the steps of (a) providing at least a part of an airfoil shaped facing of the airfoil shaped body, (b) providing a distance member, (c) connecting the distance member to an internal surface of the facing, (d) providing one reinforcing member, (e) connecting the reinforcing member with at least one first connection to the distance member at a distance from the facing and with at least one second connection to the internal surface of the facing at a distance from the distance member and at the same side of the profile chord as the connection of the distance member to the facing.

The method may further comprise the step of (f) pre-tensioning the reinforcing member with a desired amount of tension.

Preferably, steps (d) and (e) and possibly (f) are repeated for a plurality of reinforcing members.

The method may further comprise the step of (g) connecting at least one of the reinforcing members to the facing with at least one third connection at the opposite side of the distance member with relation to the at least one second connection and on the same side of the profile chord as the connection of the distance member to the facing.

The method may further comprise the step of (h) providing a filler material in a space between the reinforcing member and the inner surface of the airfoil shaped facing.

The method may further comprise the steps of providing at least one girder and connecting the girder to the internal surface of the facing.

The method may preferably comprise building up layers of one or more types of fibre materials.

The girders and connections between the girders and the facing may be one or more of those already mentioned. The same applies for the provided one or more reinforcing members and their connections to the inner surface of the airfoil shaped facing.

Particularly, but not exclusively, each of the at least one reinforcing member, or at least some of the at least one reinforcing member, may be connected to, or close to, the inner surface of one of the caps of the airfoil shaped body.

The space between the inner surface of the facing, e.g. the inner surface of one of the caps, and the at least one reinforcing member may advantageously be at least partly filled with a filler material. The filler material may preferably be a substantially solid material such as a foamed material. Such foamed material may preferably be shaped beforehand to fit in the space between the reinforcing member and the inner surface as already described. The filler material may then provide a solid basis for the at least one reinforcing member and also provide an improved stiffness, e.g. of the cap part.

The filler material may be provided in the space before the connection of the at least one reinforcing member or vice versa.

The provision of a reinforcing member may preferably be performed as part of the manufacturing process of the airfoil shaped body. However, a subsequent fitting may also be performed.

Particularly, if the at least one reinforcing member is provided as part of a separate cap, a subsequent fitting of the cap comprising the at least one reinforcing member with the facing and possible girders in a separate step of assembly is preferred. This may not only save production time, but also allow for improved quality control of the material characteristics of the separate cap and facilitate pre-tensioning of the at least one reinforcing member to a desired level.

Furthermore, the airfoil shaped body may be manufactured in sections and assembled on site if suitable. It will also be possible to renew or replace cap parts on existing airfoil shaped bodies.

Figure 5:
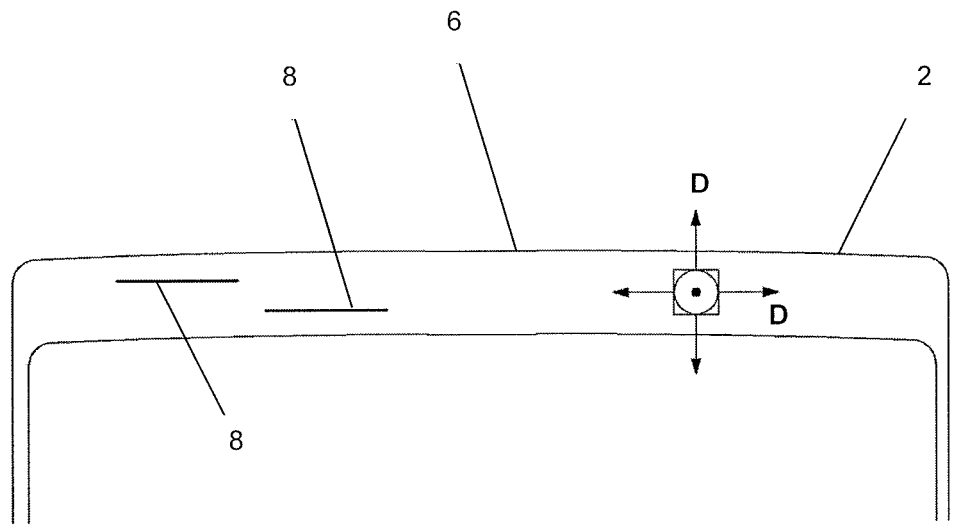
Figure 6:
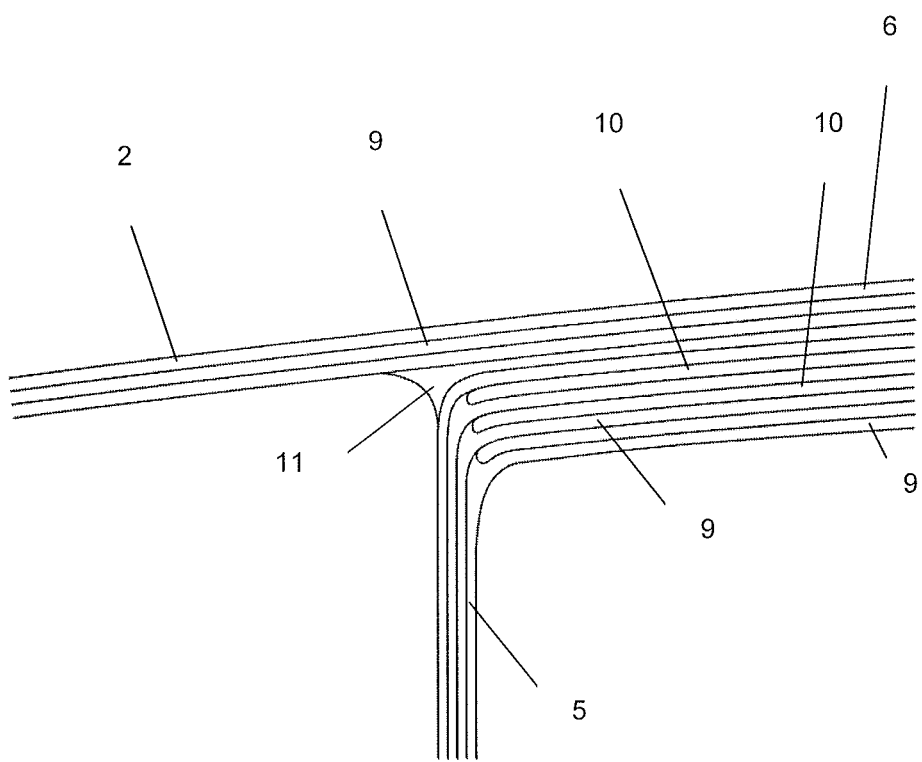
Figure 7:
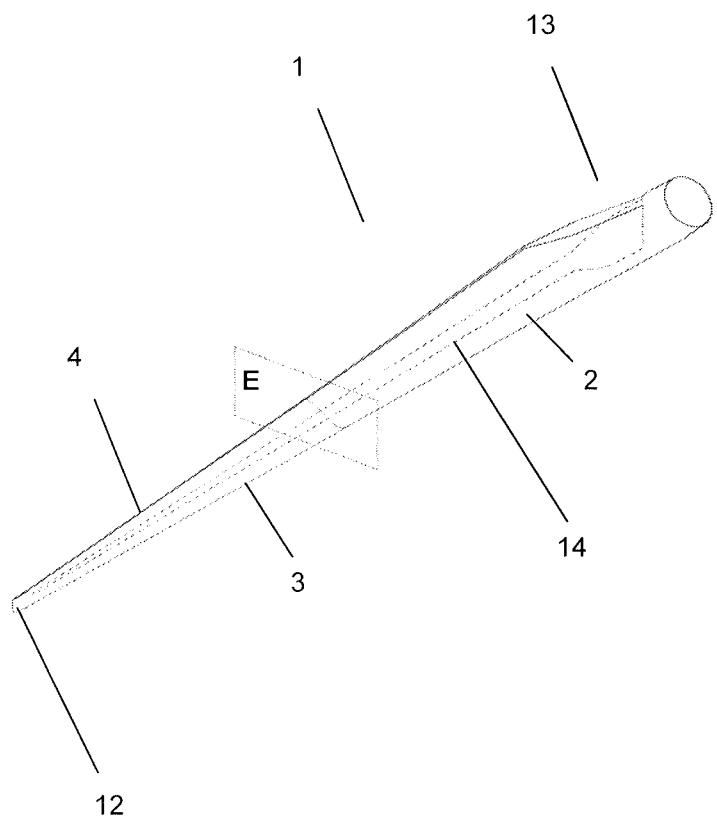
Figure 8:
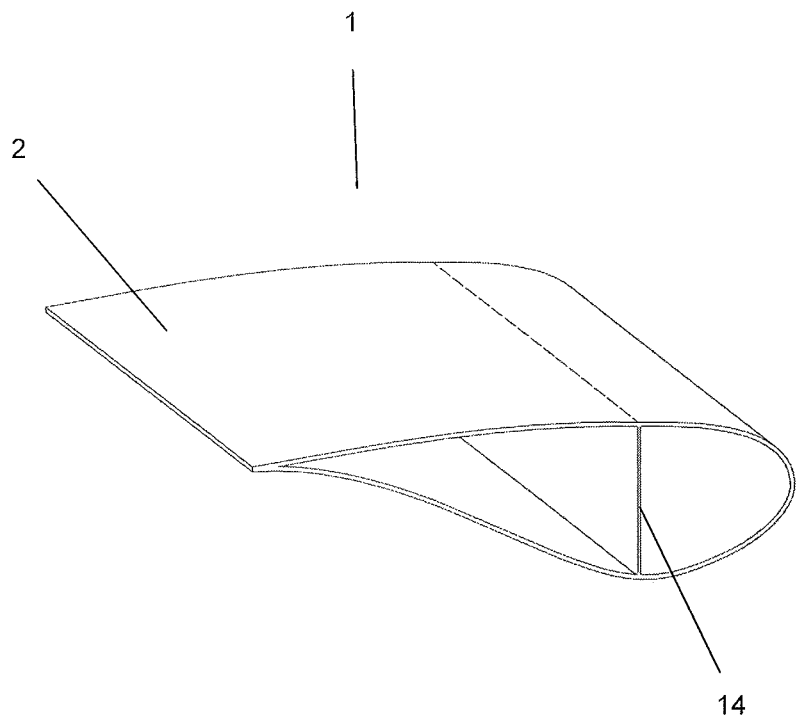
Figure 9:
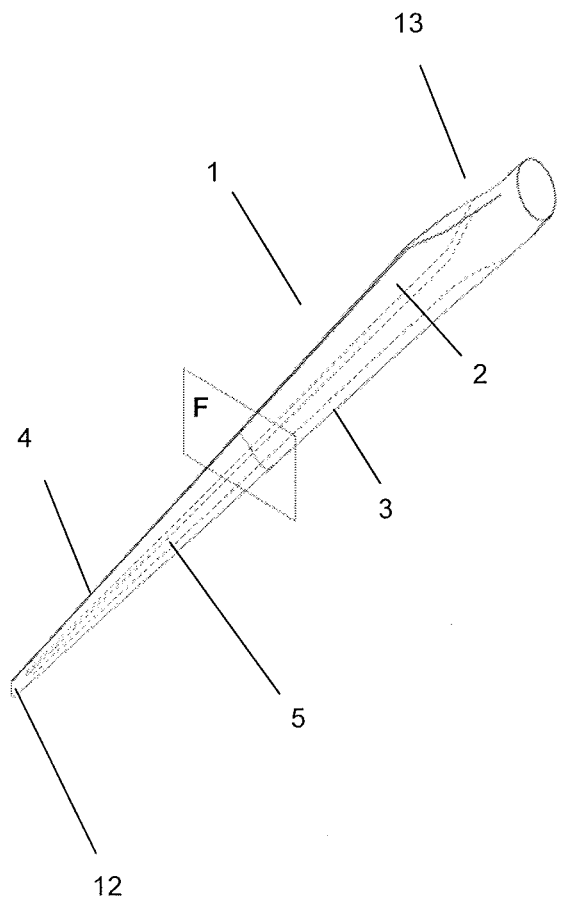
Figure 10:
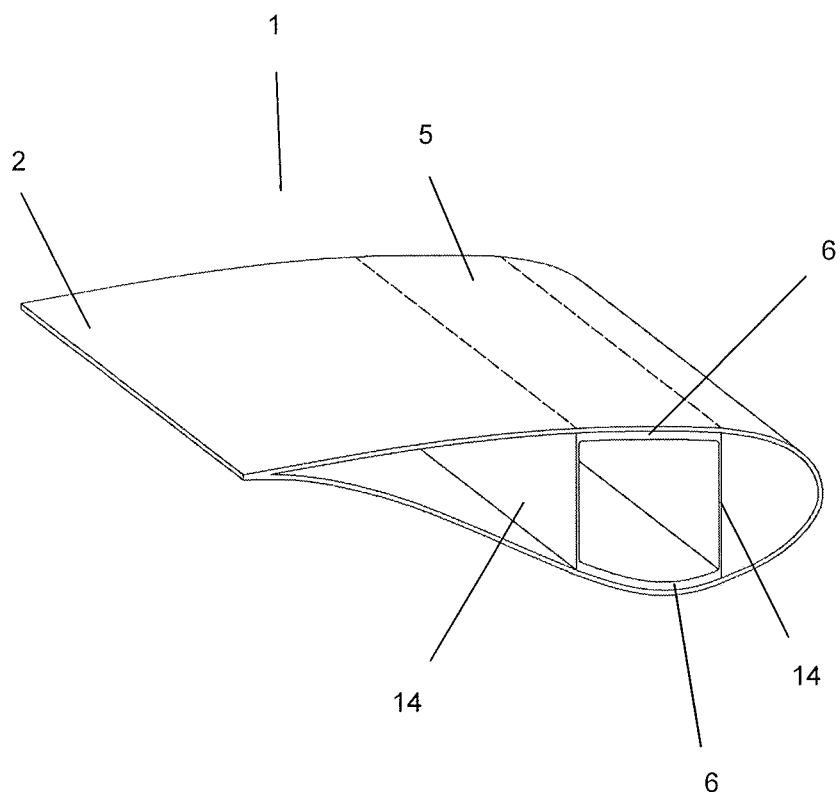
Figure 11:
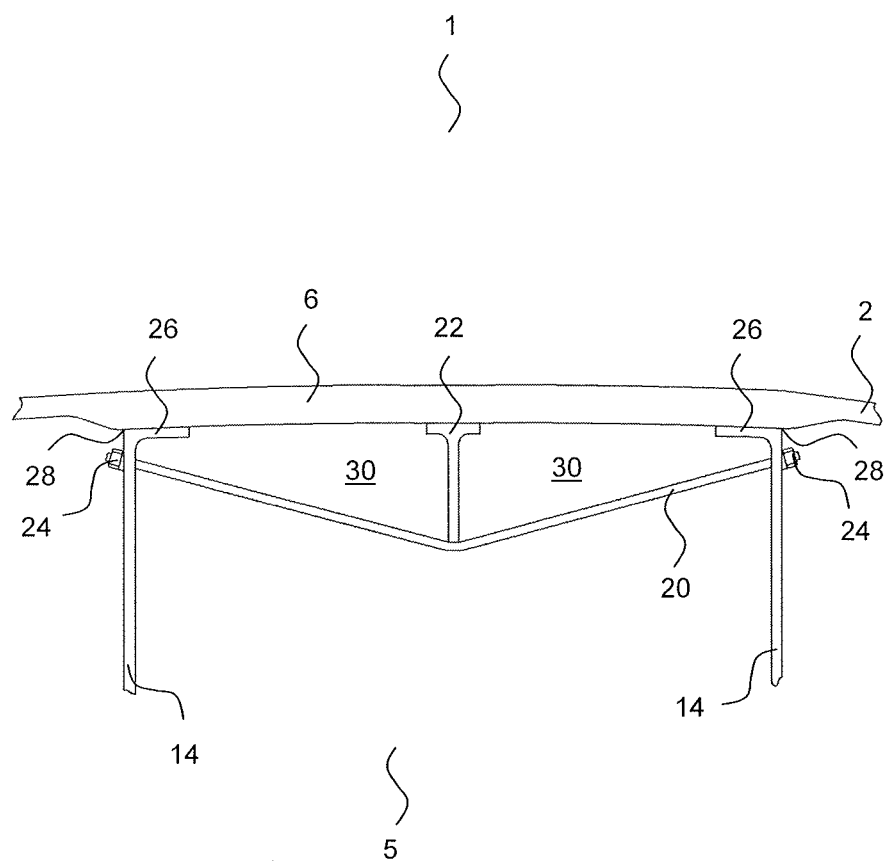
Figure 12:
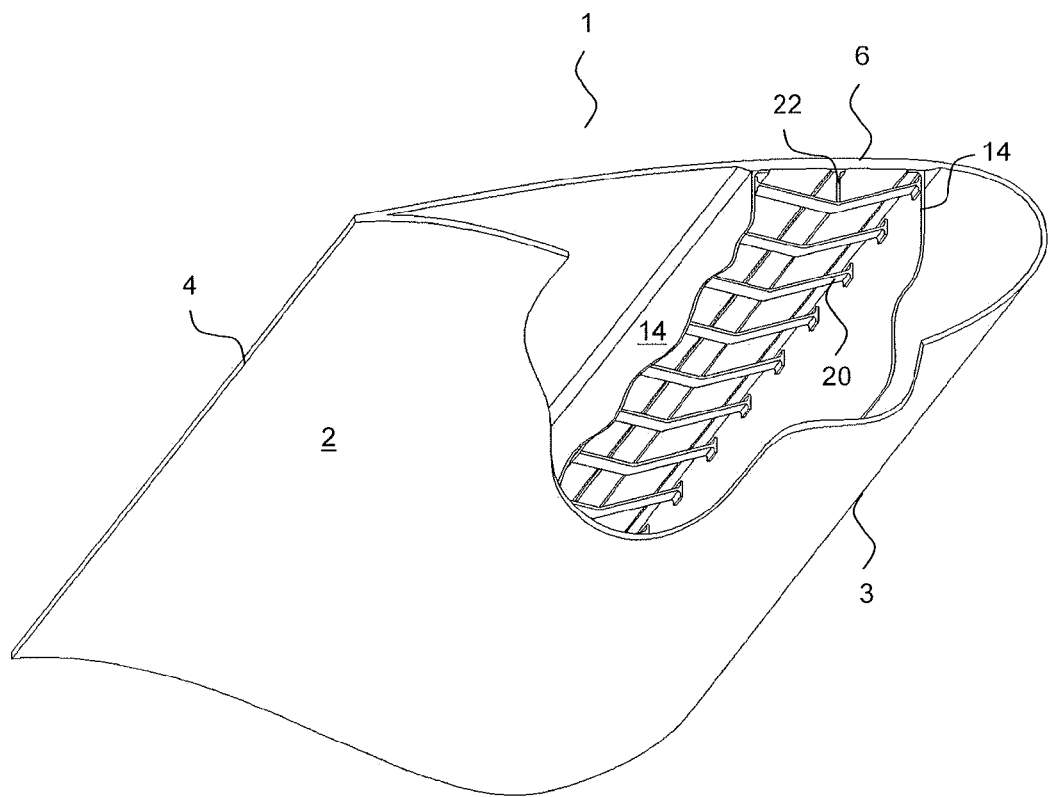
Figure 13:
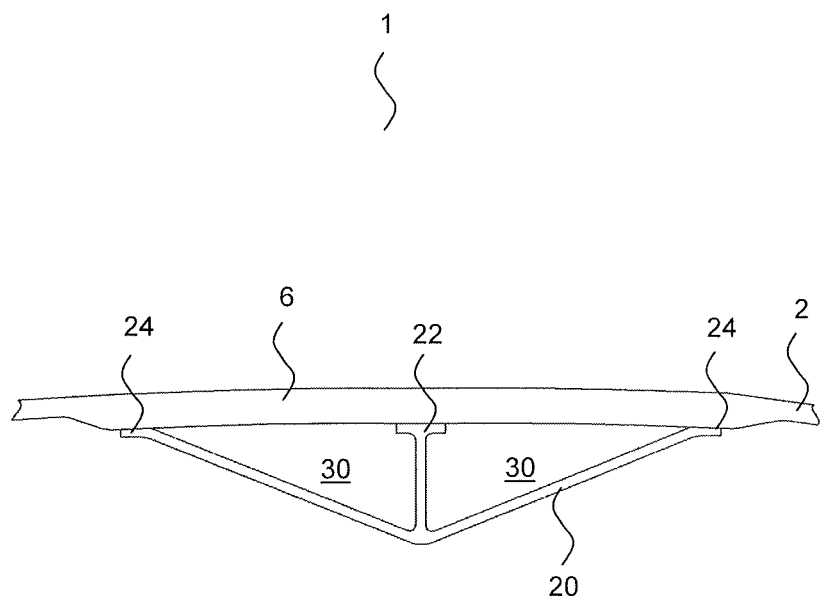
Figure 14:
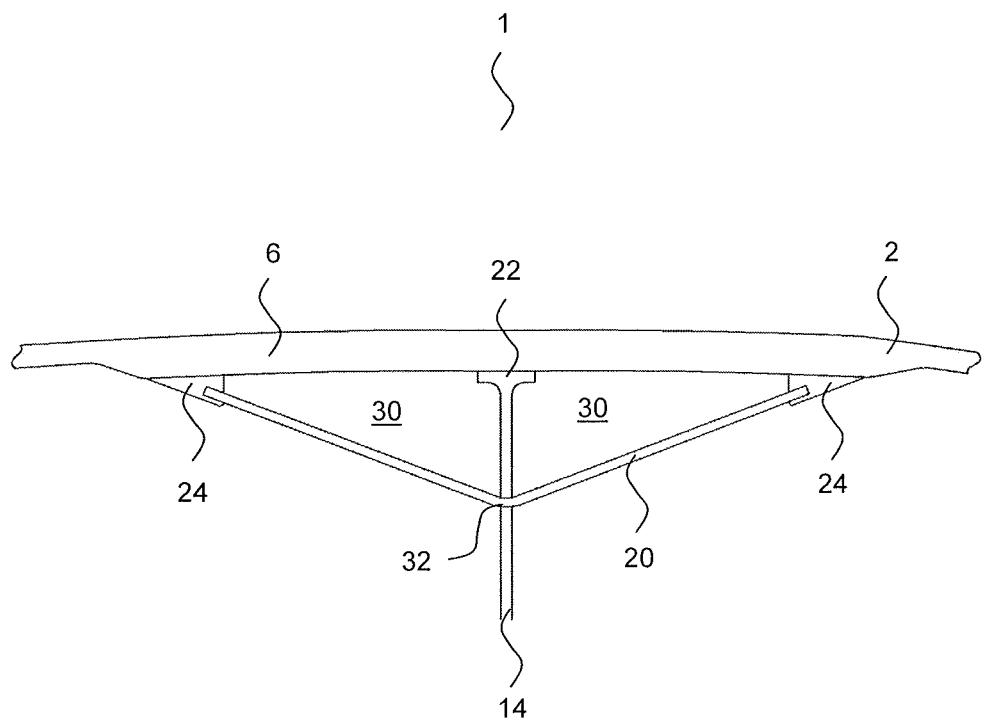
Figure 15:
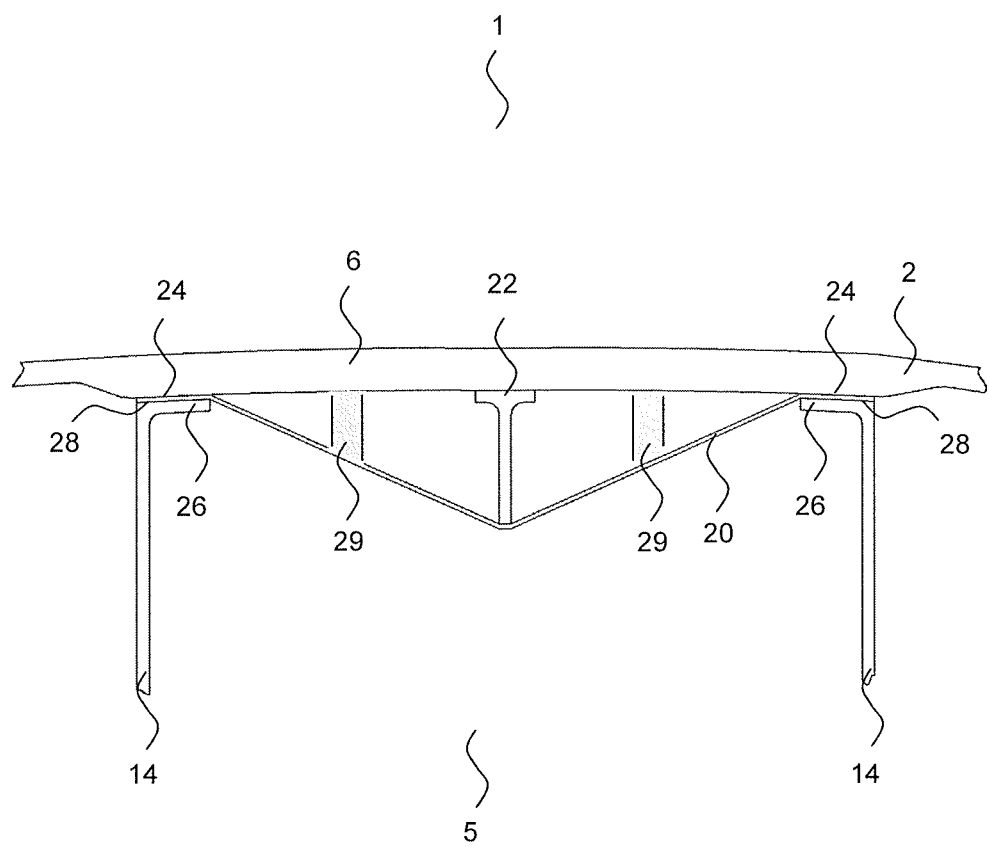
Figure 16:
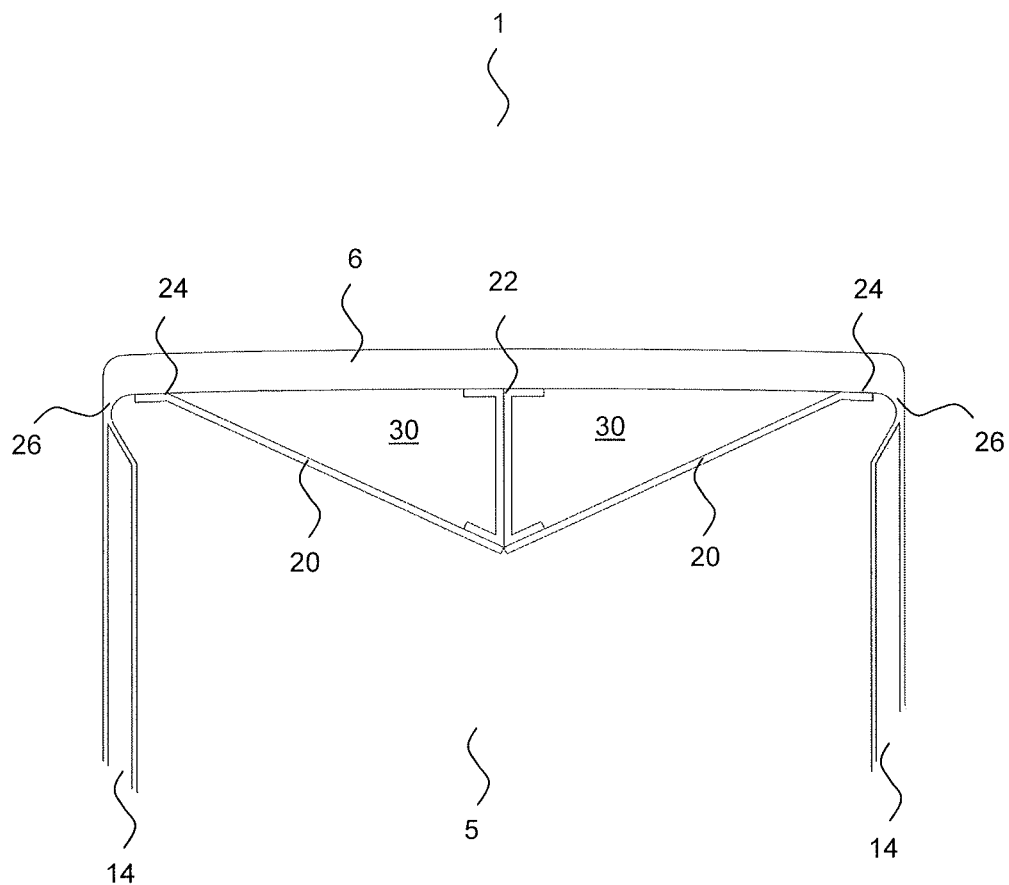
Figure 17:
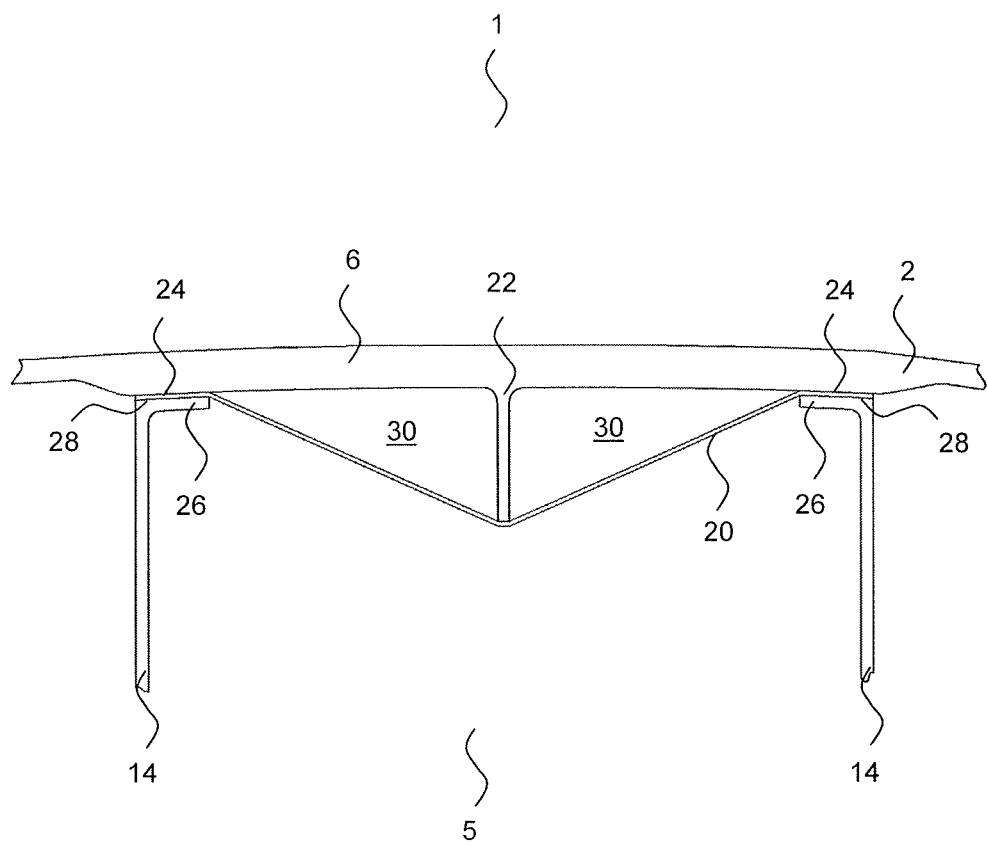
Figure 18:
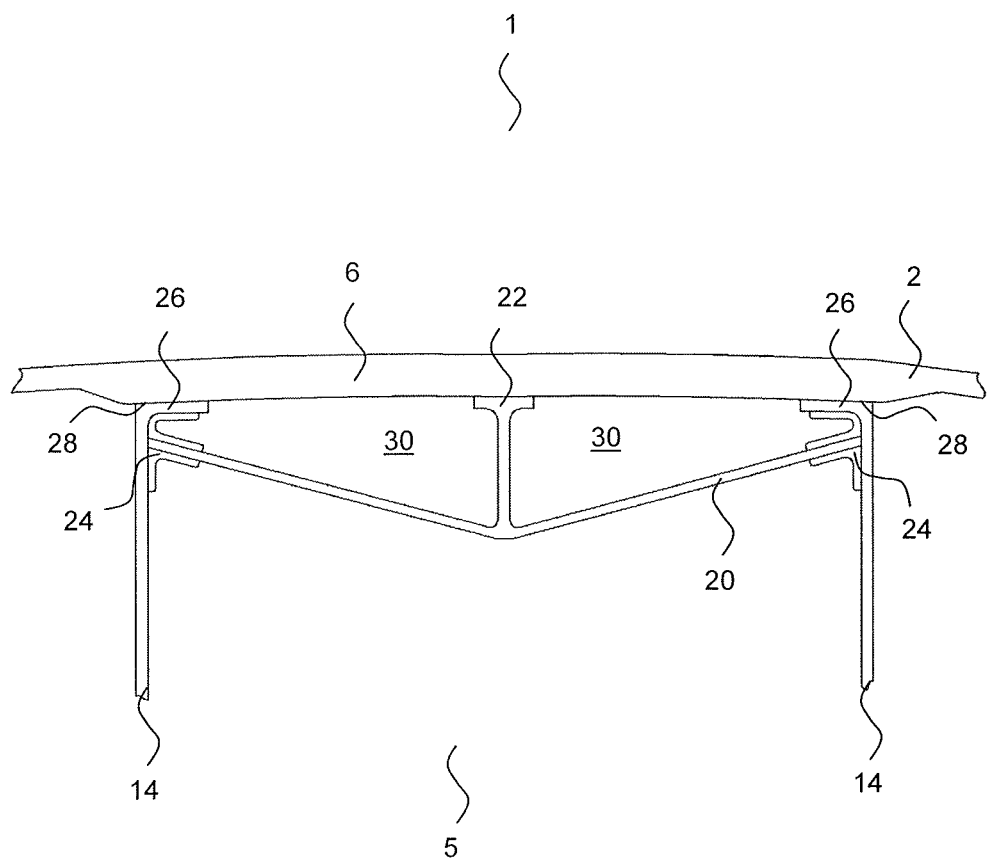
Figure 19:
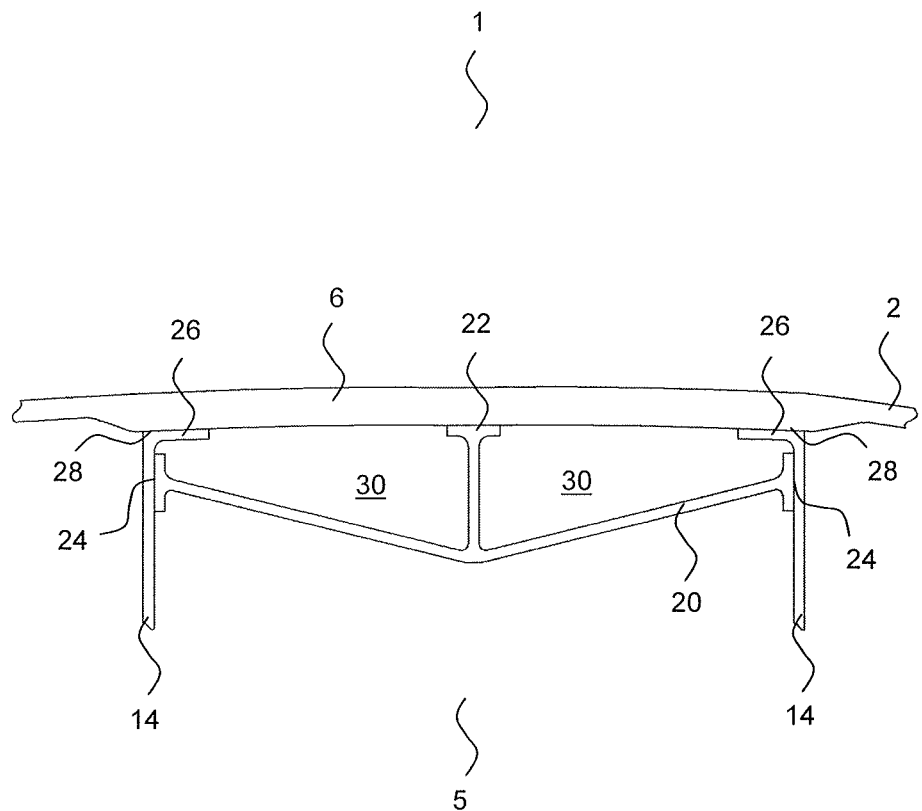
Figure 20:
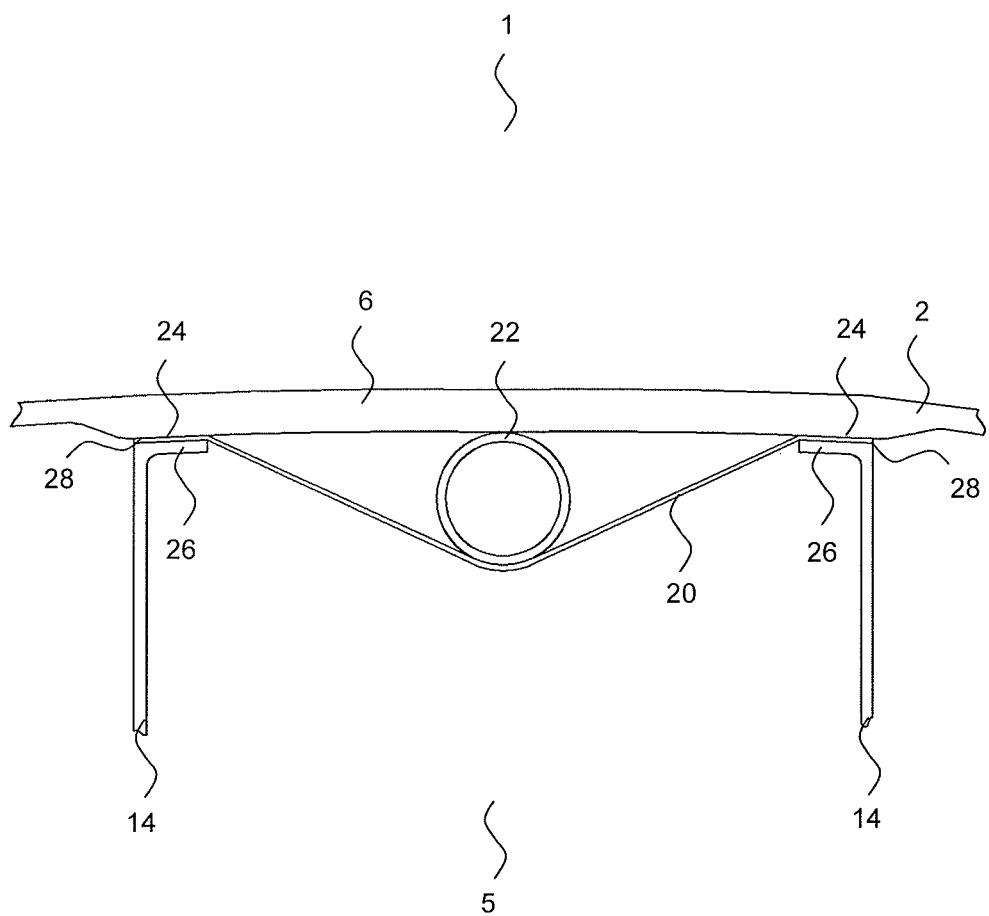
Figure 21:
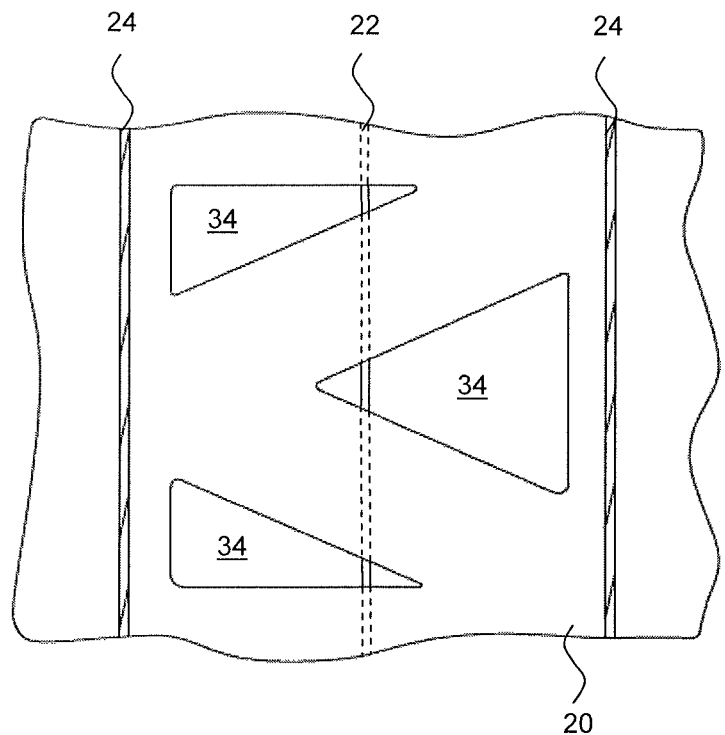
Figure 22:
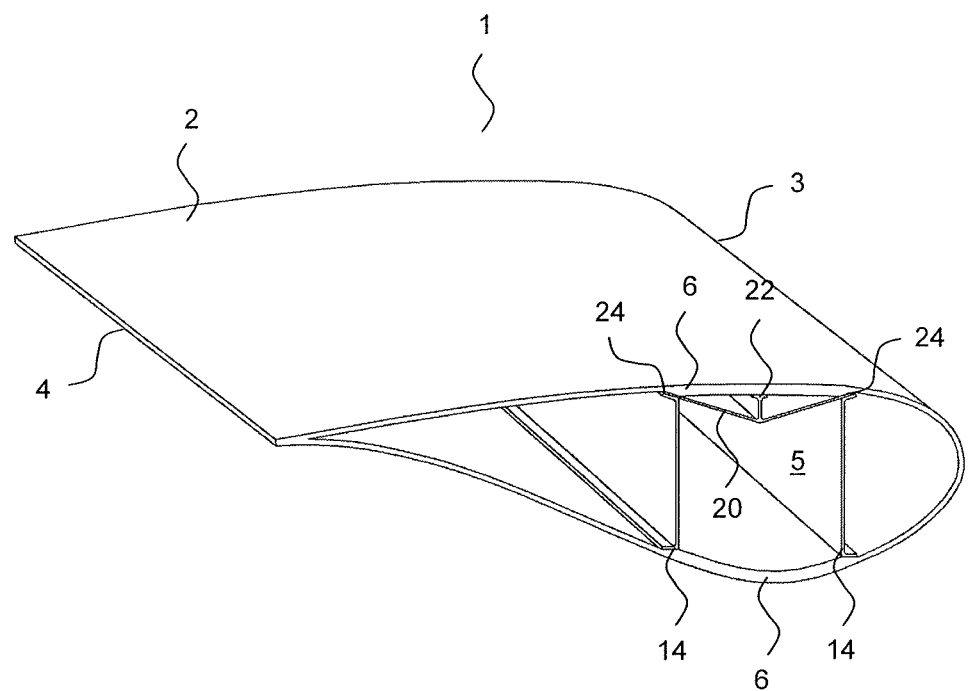
Figure 23:
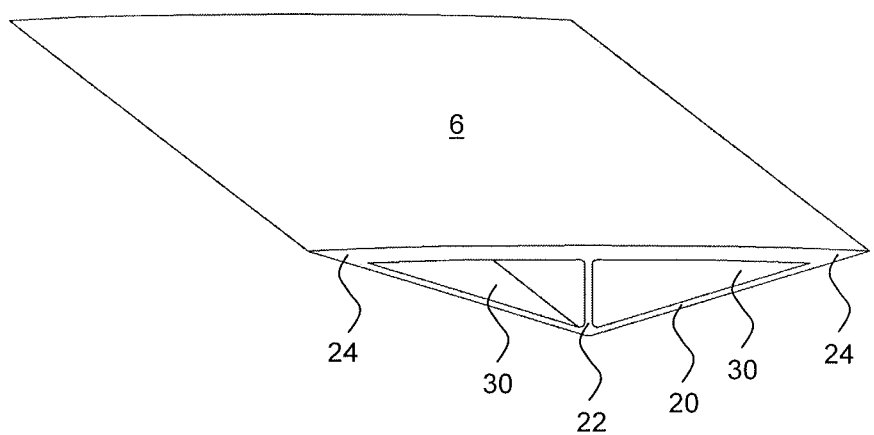
Figure 24:
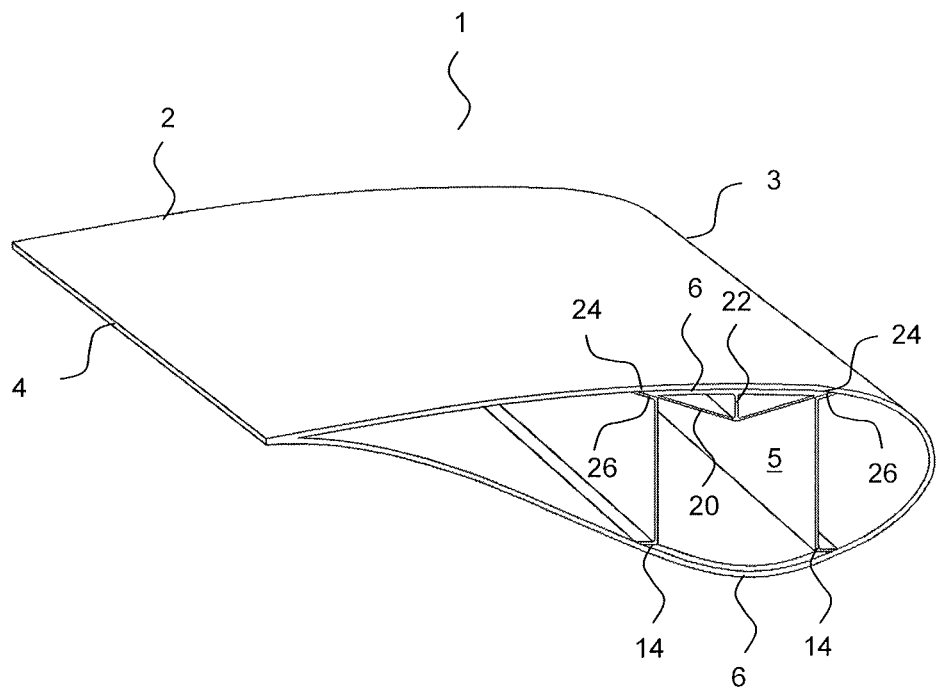
Figure 25:
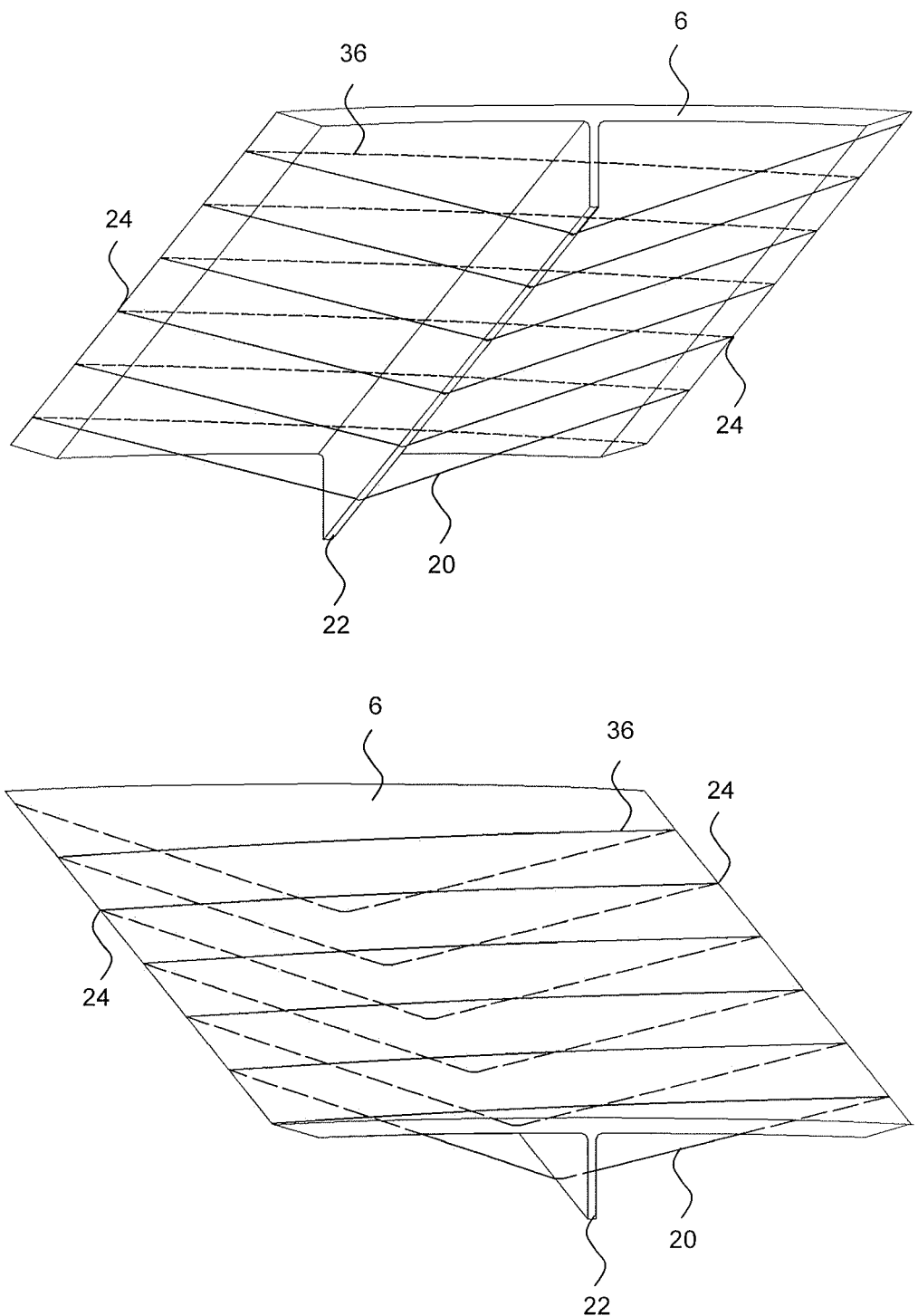
Figure 26:
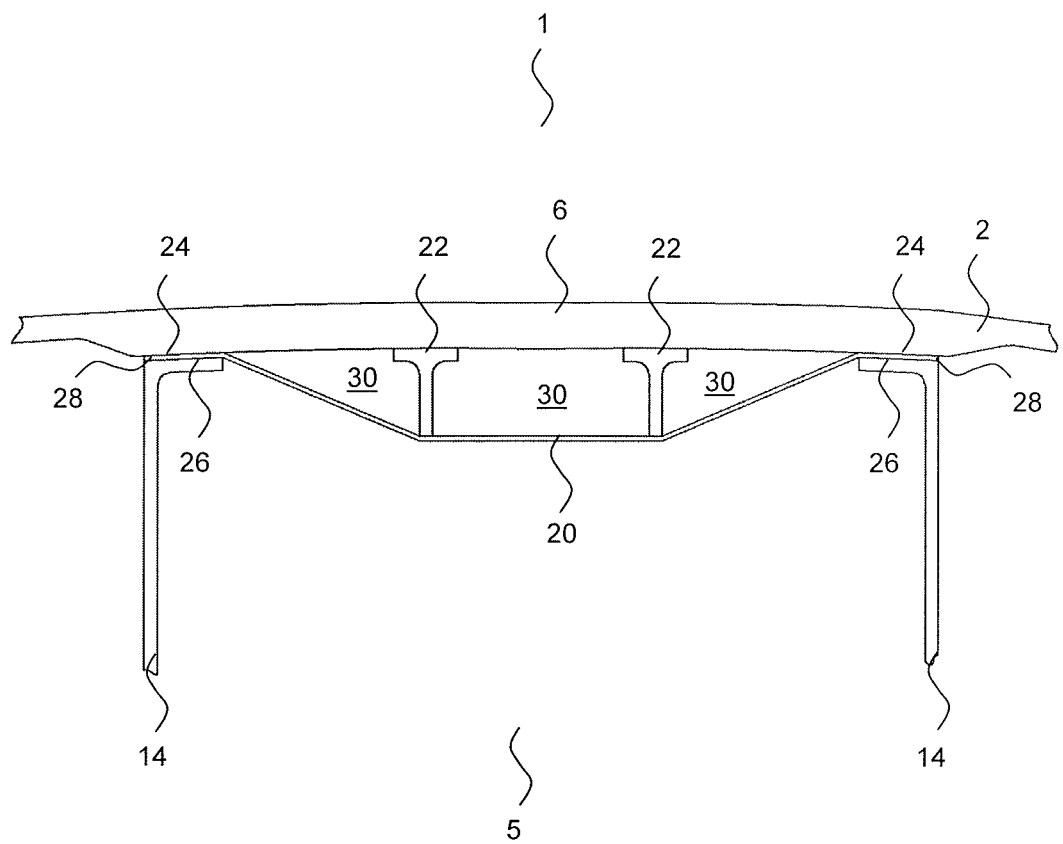
Figure 27:
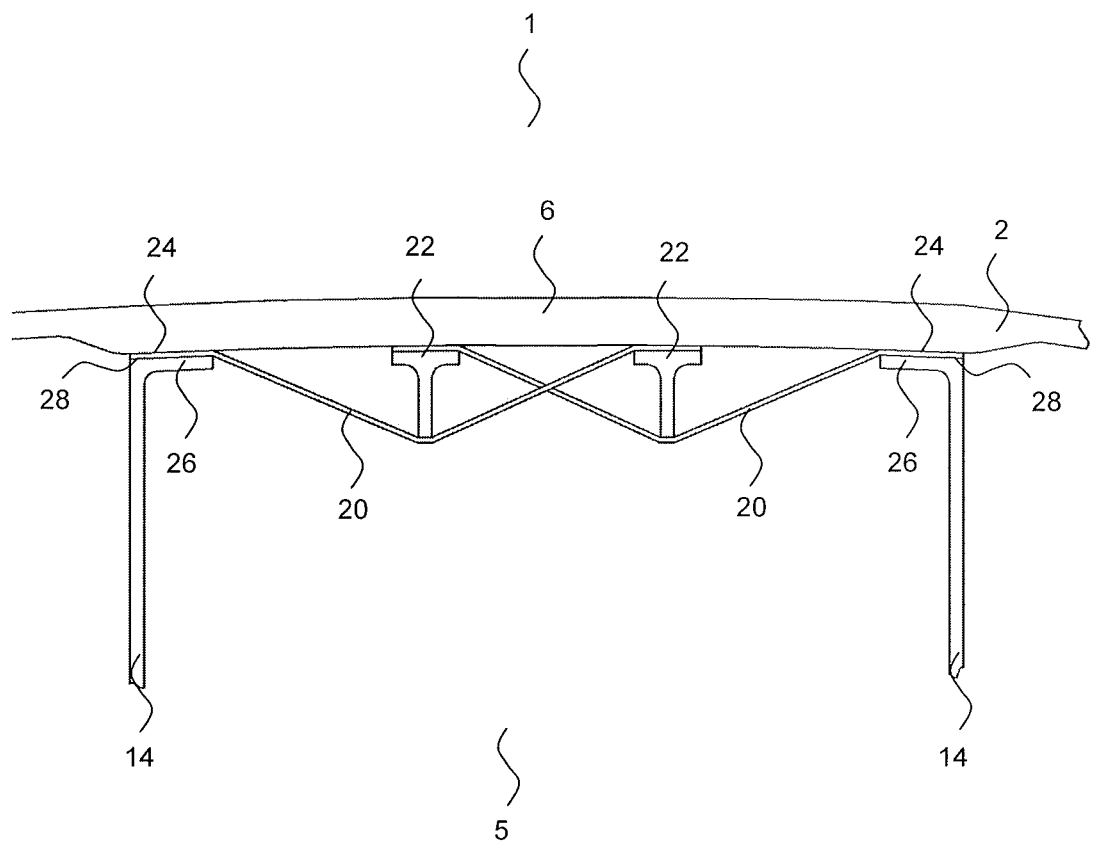
Figure 28:
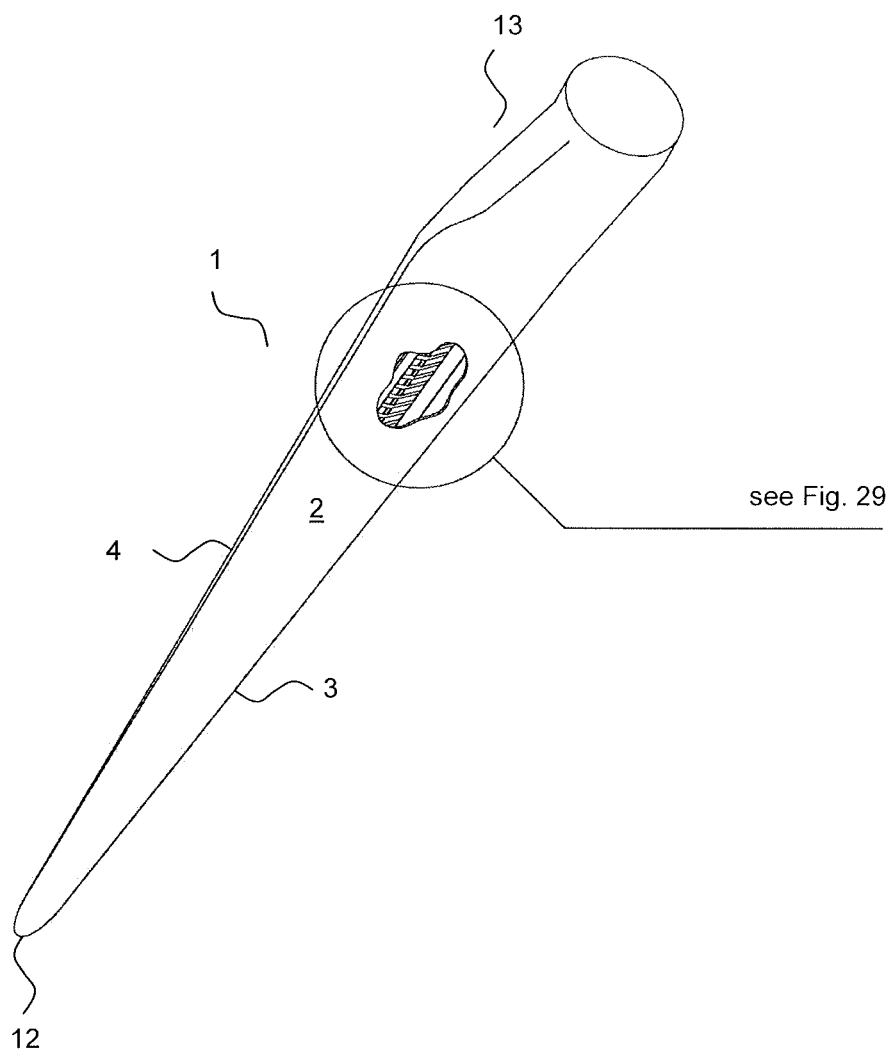
Figure 29:
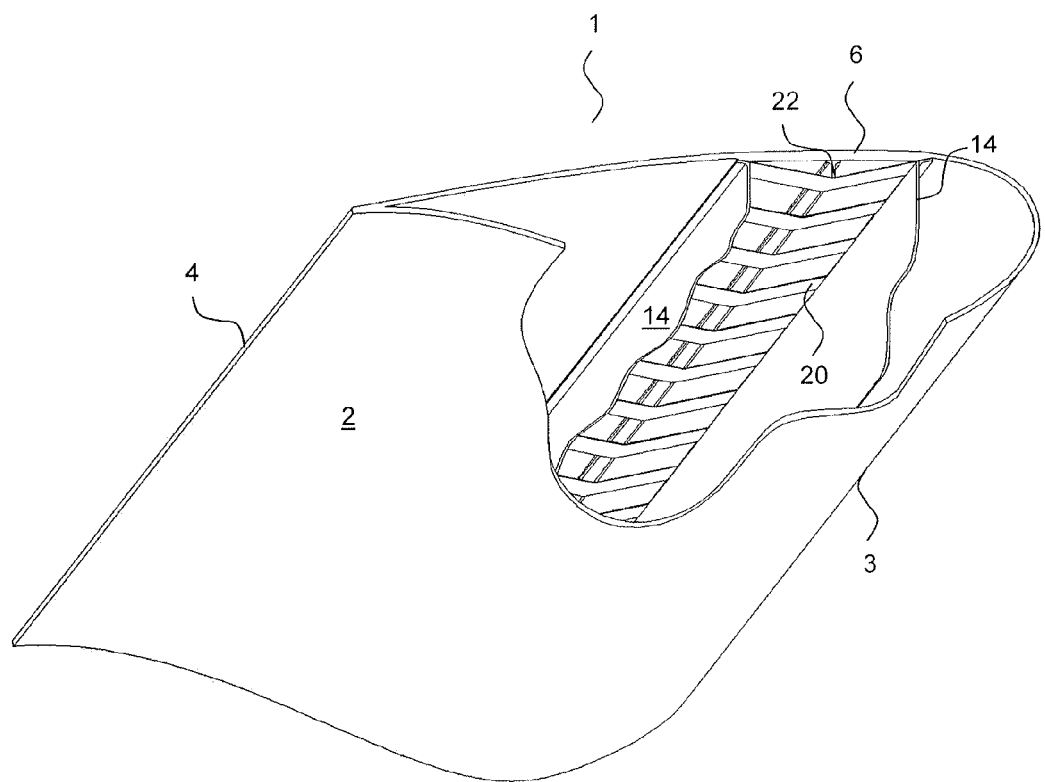
Figure 30:
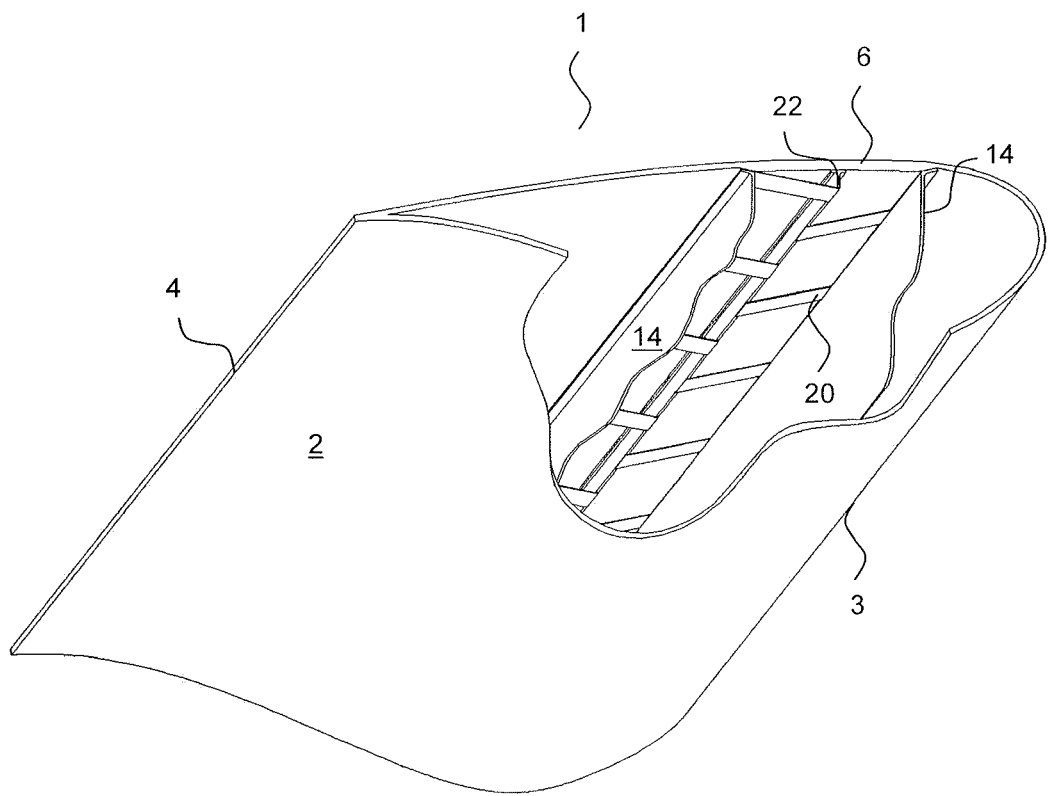
Figure 31:
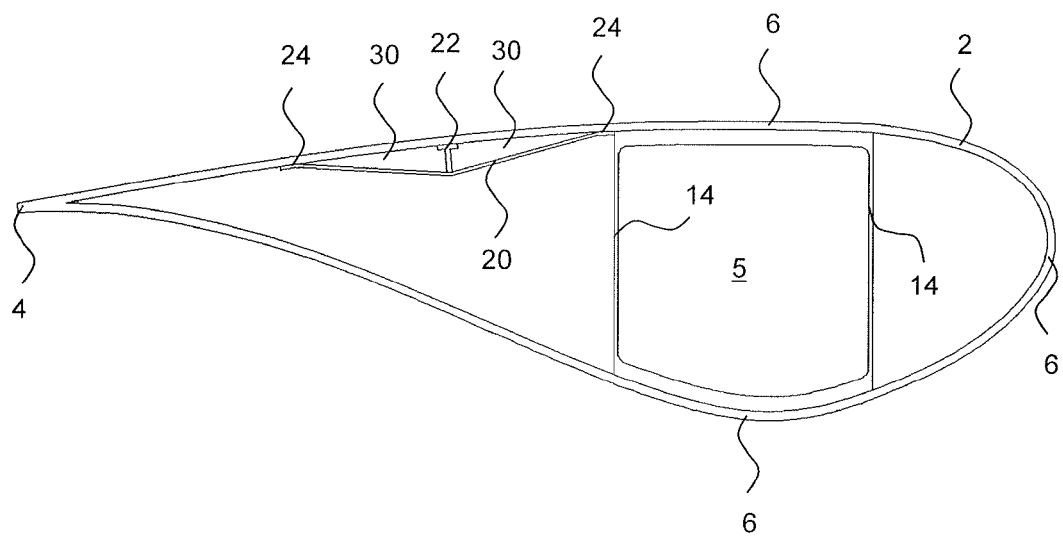

Below, the invention will be described in more detail with reference to the exemplary embodiments illustrated in the drawings, wherein FIG. 1 is a schematic view of a cross-section of an airfoil shaped body indicating the crushing pressure on the airfoil shaped body from the bending moment acting on the airfoil shaped body in operation, FIG. 2 is a schematic view of part of the cross-section of an airfoil shaped body forming the box profile and indicating the potential deformation (ovalization) caused by the crushing pressure (deformed state shown as dotted lines), FIG. 3 is a schematic perspective view of the box profile indicating three cross-sections shown in FIG. 4 and further indicating a buckling line in the longitudinal direction of the box profile (dashed line), FIG. 4 is a schematic cross-sectional view of the box profile showing the three different cross-sections of the box profile indicated in FIG. 3, FIG. 5 is a schematic view of part of a cross-section of a cap part of the box profile showing in principle multi-axial tension and compression and crack formation caused by, e.g., crushing pressure, FIG. 6 is an enlarged schematic cross-section of a facing and girder of an airfoil shaped body, FIG. 7 shows in perspective an airfoil shaped body with a single girder indicated by dashed lines and the position E is indicated of the part of the airfoil shaped body shown in detail in FIG. 8, FIG. 8 shows in perspective a part of the airfoil shaped body of FIG. 7 indicated at E, FIG. 9 shows in perspective an airfoil shaped body with two girders indicated by dashed lines and the position F is indicated of the part of the airfoil shaped body shown in detail in FIG. 10, FIG. 10 shows in perspective a part of the airfoil shaped body of FIG. 9 indicated at F, FIG. 11 is a schematic cross-section showing an airfoil shaped body with a reinforcing member connected to girders, FIG. 12 shows in perspective a part of an airfoil shaped body with a plurality of reinforcing members, FIG. 13 shows in cross-section an airfoil shaped body with a reinforcing member integrated with a distance member and connected to the inner surface of the facing, FIG. 14 shows in cross-section an airfoil shaped body with a reinforcing member in combination with a girder and connected to an inner surface of the facing, FIG. 15 shows in cross-section an airfoil shaped body with a reinforcing member connected to two girders and the inner surface of the facing and two expansion members for pre-tensioning, FIG. 16 shows in cross-section a box profile with two reinforcing members, each of which is connected to a distance member and the inner surface of the facing, FIG. 17 shows in cross-section an airfoil shaped body with a reinforcing member integrated with the respective cap and connected to two girders and the inner surface of the facing, FIG. 18 shows in cross-section an airfoil shaped body with a reinforcing member integrated with the distance member and connected to the inner surface of the facing via two girders, FIG. 19 shows in cross-section an airfoil shaped body with a reinforcing member integrated with the distance member and connected to the inner surface of the facing via two girders, FIG. 20 shows in cross-section an airfoil shaped body with a reinforcing member supported by a movable distance member and connected to two girders and the inner surface of the facing, FIG. 21 is a schematic top view of a reinforcing member with a plate part or a laminate part provided with cut-outs, FIG. 22 shows in perspective an airfoil shaped body with a reinforcing member with plate-shaped parts extending along the longitudinal extension of the airfoil shaped body, FIG. 23 shows in perspective a separate reinforced cap part, FIG. 24 shows in perspective the separate cap part of FIG. 23 mounted in the airfoil shaped body, FIG. 25 shows in perspective a separate reinforced cap part with a plurality of reinforcing members formed by a wire wound around the cap part and the distance member, FIG. 26 shows in perspective an airfoil shaped body with a reinforcing member and two distance members, FIG. 27 shows in perspective another airfoil shaped body with a reinforcing member and two distance members, FIG. 28 shows in perspective an airfoil shaped body in the form of a wind turbine blade, FIG. 29 shows in perspective and in more detail a part of the wind turbine blade of FIG. 28, FIG. 30 shows a wind turbine blade similar to the wind turbine blade of FIGS. 28 and 29; however with a different arrangement of reinforcing members, and FIG. 31 shows in perspective an airfoil shaped body with a reinforcing member arranged for reinforcing a flat trailing part of the suction side of the facing.

The airfoil shaped body with at least one reinforcing member will now be described more fully hereinafter with reference to the accompanying drawings, in which various examples are shown. The accompanying drawings are schematic and simplified for clarity, and they merely show details which are essential to the understanding of the invention, while other details have been left out. The invention may be embodied in different forms not shown in the accompanying drawings and should not be construed as limited to the examples set forth herein. Rather, these examples are provided so that this disclosure will be thorough and complete, and will fully convey the scope of the invention to those skilled in the art. Like reference numerals refer to like elements throughout.

FIG. 1 shows a cross-section of a conventional airfoil shaped body 1 having a facing 2 with a leading edge 3 and a trailing edge 4. Also indicated are the box profile 5 and the cap parts 6 thereof. The cap parts 6 constitute the top and bottom parts of the box profile 5. A dashed line indicates the profile chord 7. An airfoil-shaped body 1 moved through a fluid substantially along the profile chord 7 with the leading edge 3 in front generates a force called lift substantially in the flapwise direction, substantially perpendicular to the profile chord 7. The direction of lift is upward in FIG. 1. The side of the airfoil shaped body 1 facing in the opposite direction of the lift is denoted the pressure side of the body 1, the underside of the body in FIG. 1, and the side of the airfoil shaped body 1 facing in the direction of the lift is denoted the suction side of the body 1, the top side of the body in FIG. 1. As previously described, the airfoil shaped body is primarily loaded in the flapwise direction by aerodynamic and inertia forces. The flapwise direction is illustrated by arrows A in FIG. 1. The forces cause the airfoil shaped body 1 to bend along its longitudinal extension and create a crushing pressure indicated by arrows B. Apart from possible differences in size, the cross-section illustrated in FIG. 1 is similar at any position along the longitudinal extension of the airfoil shaped body between a tip part and a root part of the airfoil shaped body.

FIG. 2 shows a part of a cross-section of the box profile 5 indicating an example of the deformation of the box profile 5 with character of an ovalization caused by the bending of the airfoil shaped body. In FIG. 2, an unloaded shape of the box profile 5 is indicated with solid line 5a, and a loaded or ovalized (flattened) shape is indicated by dashed line 5b. Directions of possible further deformation of the box profile 5 by increased load are indicated by arrows C.

FIG. 3 shows in perspective a part of the box profile 5 together with indication of three positions of cross-sections 5c, 5d, 5e that are illustrated for comparison in FIG. 4. A buckling pattern of the box profile 5 is also illustrated by dotted, undulated curved line L. Buckling causes the shape of the cross-section of the box profile 5 to vary along the longitudinal extension of the box profile 5.

FIG. 4 shows the cross-sections 5c, 5d, 5e indicated in FIG. 3, illustrating possible variations along the longitudinal extension of the box profile of the shape of cross-sections of the box profile 5. Cross-sections 5d and 5e are cross-sections of a loaded or ovalized box profile. Cross-section 5c is an unloaded cross-section of the box profile 5. FIG. 4 illustrates how the forces applied to the box profile cause its cross-sectional shape to vary dynamically during operation of the airfoil shaped body and thus, leading to fatiguing of the profile.

FIG. 5 shows in more detail a cap part 6 of the box profile in cross-section. Arrows D indicate multi-axial stress in the laminate material of the cap part 6 as a result of the deformation, e.g. ovalization, caused by bending of the airfoil shaped body. Also indicated are examples of interlaminar cracks 8 in the facing 2 that are potentially created by the multi-axial stress, e.g. alternating tension and compression, in the laminate. The multi-axial stress may result in delamination, intralaminar matrix cracking, matrix debonding, etc.

FIG. 6 shows in more detail and in cross-section, an example of the facing 2 and the box profile 5 and their interconnection. As illustrated, the facing 2 may be made of a laminate 9 of fibre glass. The cap part 6 of the box profile 5 further comprises layers 10 of the same material as the facing or another material, such as a material reinforced with carbon fibres. The layers 9 of fibre glass and layers 10 of carbon fibres are bonded together with layers 11 of a bonding material, such as glue.

FIG. 7 schematically illustrates in perspective an airfoil shaped body 1 in the form of a wind turbine blade 1 with an airfoil shaped facing 2 that forms the outer surface of the airfoils shaped body 1 and surrounds an internal volume of the body 1, and having a leading edge 3 and a trailing edge 4 extending along the longitudinal extension of the body 1 from its tip 12 to its root 13. The body 1 has a single internal girder 14 indicated by dashed lines. E indicates the position of the part of the airfoil shaped body 1 illustrated in further detail in FIG. 8. E may be positioned anywhere along the longitudinal extension of the airfoil shaped body 1 between the tip 12 and the root 13 of the body 1 and result in the same FIG. 8 apart from size differences due to the tapering of the wind turbine blade 1 from the root 13 towards the tip 12.

FIG. 8 illustrates in more detail a part of the airfoil shaped body 1 shown in FIG. 7. The illustrated part of the airfoil shaped body 1 is positioned at E in FIG. 7. The illustrated airfoil shaped body 1 has a glass fibre facing 2 that encloses an internal volume of the body 1. A girder 14 reinforces the facing 2 and has a substantially planar shape and extends substantially along the entire longitudinal extension of the airfoil shaped body 1 and between an upper part and, in relation to the profile chord, an opposite lower part of the facing 2 substantially in the flapwise direction of the airfoil shaped body 1.

FIG. 9 schematically illustrates in perspective an airfoil shaped body 1 in the form of a wind turbine blade 1 with an airfoil shaped facing 2 that forms the outer surface of the airfoils shaped body 1 and surrounds an internal volume of the body 1, and having a leading edge 3 and a trailing edge 4 extending along the longitudinal extension of the body 1 from its tip 12 to its root 13. The body 1 has a box profile 5 indicated by dashed lines. F indicates the position of the part of the airfoil shaped body 1 illustrated in further detail in FIG. 10. F may be positioned anywhere along the longitudinal extension of the airfoil shaped body 1 between the tip 12 and the root 13 of the body 1 and result in the same FIG. 10 apart from size differences due to the tapering of the wind turbine blade 1 from the root 13 towards the tip 12.

FIG. 10 illustrates in more detail a part of the airfoil shaped body 1 shown in FIG. 9. The illustrated part of the airfoil shaped body 1 is positioned at F in FIG. 9. The illustrated airfoil shaped body 1 has a glass fibre facing 2 that encloses an internal volume of the body 1. A box profile 5 with two girders 14 and two cap parts 6 reinforces the facing 2. The box profile 5 has a substantially rectangular shape and extends substantially along the entire longitudinal extension of the airfoil shaped body 1 and between an upper part and, in relation to the profile chord, an opposite lower part of the facing 2 substantially in the flapwise direction of the airfoil shaped body 1.

FIG. 11 schematically shows a cross-section of a box profile 5 of an airfoil shaped body 1 similar to the airfoil shaped body shown in FIGS. 9 and 10; but also having a reinforcing member 20 and a distance member 22. The box profile 5 comprises two girders 14 extending inside the airfoil shaped body 1 and along the longitudinal extension of the airfoil shaped body 1 and with a mutual transversal distance perpendicular to the longitudinal direction or extension of the airfoil shaped body 1. The girders 14 have flanges 26 for connection to an inner surface of the facing 2.

In FIG. 11, the leading edge of the airfoil shaped body is to the right and the trailing edge is to the left. The illustrated cap part 6 of the facing 2 and of the box profile 5 resides on the suction side of the airfoil shaped body, and it has a large radius of curvature and is almost planar. In order to reinforce the flat cap part 6, primarily against crushing pressure, a distance member 22 is mounted inside the airfoil shaped body 1 between the two girders 14. The distance member 22 has a flange that rests, preferably bonded, against the cap part 6 of the facing 2 and extends from the cap 6 into the internal volume of the airfoil shaped body 1. A reinforcing member 20 is also mounted inside the airfoil shaped body 1 so that it extends transversal to the longitudinal extension of the airfoil shaped body 1 and operates in tension for reinforcing the facing 2 against inward deflections. As shown in FIG. 11, the reinforcing member 20 is connected to the facing 2 at first and third connections 24 at or near the edges of the cap 6 and rests against the distance member 22 at a distance from the cap 6 forming the second connection. An inward deflection of the cap 6 would increase the distance between the reinforcing member 20 at the distance member 22 and each of the connections 24; however the reinforcing member 20 has a high tensile strength and therefore inhibits such an increase and thereby increases the strength of the facing against crushing pressure. In the illustrated example, the reinforcing member 20 is connected to the facing 2 via the girders 14, each of which has flange 26 that is bonded to the inner surface of the cap part 6 of the facing 2.

The reinforcing member 20 may be constituted by any type of constructional member capable of taking up loads.

Between the distance member 22 and the facing 2, the reinforcing member 20 may have the shape of a rod, a plate, a tube, etc., and may be capable of resisting both compression forces and tensional forces.

Since, the reinforcing element 20 need not be capable of resisting compression forces, the reinforcing member 20 may be a wire, a rope, a thread, a fibre, or a web of fabric, etc.

The reinforcing member 20 may have any suitable cross-section, for example a substantially round or polygonal cross-section, such as substantially rectangular, square, triangular, circular, oval, elliptical, etc, preferably rectangular and flat.

The reinforcing member 20 may be made of any suitable material. Fibre reinforced plastic is presently preferred.

The reinforcing member 20 may comprise fibres of very high stiffness and strength such as, glass fibres, carbon fibres, aramid fibres, polyethylene fibres, PBO fibres (polypheylene benzobisoxqazole), etc.

The reinforcing member 20 may also be made of wood, such as bamboo, birch, plywood, etc, or another material based on plant fibres with high cellulose content, such as bast fibres, such as flax, jute, etc. These fibres may be used as reinforcement in a composite material, such as a reinforced plastic, or may be used in the form of wires or rods. The reinforcing member 20 may also be made of a combination of the above mentioned materials.

The reinforcing member 20 may also be made of steel, light metal alloys, etc.

The reinforcing member 20 is required to have a high tensional strength only; preferably, the reinforcing member 20 need not carry other loads so that the reinforcing member may be thin whereby its weight and cost are kept at a minimum. The thickness of the reinforcing member is preferably less than 10 times the maximum thickness of the facing 2, more preferred less than 5 times the maximum thickness of the facing 2, still more preferred less than 2 times the maximum thickness of the facing 2, yet more preferred less than the maximum thickness of the facing 2, still more preferred less than 0.75 times the maximum thickness of the facing 2, even more preferred less than half the maximum thickness of the facing 2.

The reinforcing member 20 is connected to the girders 14 with connections 24 proximate respective connections 28 of the girders 14 to the facing 2.

The connections 24, 28 may comprise any suitable kind of joint such as welded, glued, melted, fused or other simple mechanical connections, e.g. bolted connections. The cooperating connections 24, 28 and interconnecting parts must be sufficiently rigid to maintain their shape when subjected to tension in order to properly cooperate with the reinforcing member 20 to prevent the connections 28 on the facing 2 from being displaced in relation to each other and the interconnection of the distance member 22 and the reinforcing member 20.

The connections 24 may be releasable connections that may comprise any suitable kind of joint, such as a snap-fit, press-fit, groove-and-tongue connection or other simple mechanical connection, bolted connections as shown in FIG. 11. A releasable interconnection may be used to provide an aerofoil shaped body with an increased degree of flexibility.

The reinforcing member 20 secures and keeps the shape of the shell substantially unchanged when the aerodynamic profile is loaded by forces in the edgewise and flapwise direction. Thus, the overall strength of the airfoil shaped body 1 is increased significantly, including the resistance against crushing pressure and buckling.

With inclusion of the reinforcing member 20 inside the airfoil shaped body 1, the dimensions of materials used for the facing 2 may further be significantly reduced compared to conventional airfoil shaped bodies and thus, facilitates lower dynamic loads on other parts of a system with the airfoil shaped body, improved handling and transportation characteristics of the airfoil shaped body 1, and a reduction of material costs.

The reinforcing member 20 improves the aerodynamic efficiency of the airfoil shaped body 1 since the designed shape of the airfoil shaped body 1 is maintained to a higher degree than for a conventional airfoil shaped body.

The reinforcing member 20 may extend along substantially the entire longitudinal extension of the airfoil shaped body 1, or a major part of the entire longitudinal extension of the airfoil shaped body 1; or, as illustrated in FIG. 12 in which part of the facing 2 has been cut away for illustration purposes, two or more reinforcing members 20 may be positioned in spaced relationship along at least a part of the longitudinal extension of the airfoil shaped body 1. The distance between neighbouring reinforcing members 20 may preferably be less than $20 \times D$, more preferred less than $10 \times D$, most preferred less than $5 \times D$, wherein D is the lateral or edgewise distance between the distance member and one of the connections of the reinforcing member 20 to the facing 2.

The value of parameter D may be identical for two or more neighbouring reinforcing members.

However, since the width of the cross-section of the airfoil shaped body 1 typically decreases towards the tip of the airfoil shaped body 1, the distance D2 of a reinforcing member located closer to the tip will be smaller than the distance D1 of a reinforcing member located closer to the root of the airfoil shaped body 1. The resulting maximum distance between two neighbouring reinforcing members 20 may preferably be calculated based on the minimum of the two distances, i.e. distance D2, or based on the mean value of D1 and D2. It has been found that values of the resulting distance D fulfilling this relationship, there is a good balance between the reinforcing members' ability to take up the shear forces, the total weight of the airfoil shaped body 1 and the stiffness of the airfoil shaped body 1. However, the maximum distance between two reinforcing members 20 may in stead be based on other requirements, such as, but not limited to, a need for a particularly strong airfoil shaped body design, e.g. when the airfoil shaped body 1 is intended to be subjected to repeatedly severe weather conditions, such as when erected at open sea as a part of an offshore wind turbine.

The reinforcing members 20 may be positioned in certain sections of the airfoil shaped body 1 only, possibly without any predetermined or calculated maximum distance. Particularly, but not exclusively, the reinforcing members 20 may be located at positions wherein a substantial deformation of the cap 6 is expected or established.

The reinforcing members 20 may be equipped with or may consist of active piezoelectric installations, etc., that may be activated by means of voltage, current, electric or magnetic field, whereby the length of the reinforcing member changes and/or stresses are imposed on the member. By this it is possible to change the curvature of the profile's surface and thereby change the aerodynamic properties of the profile. The reinforcing member(s) may be equipped with or may consist of passive installations, such as dampers, for further suppression of deformation and oscillation of the airfoil shaped body 1. With these installations it is possible to optimize the performance of the airfoil shaped body 1.

A space 30 between the reinforcing member 20 and the facing 2 may be partly or substantially completely filled with a filler material.

Preferably, each reinforcing member 20 is pre-tensioned to a desired level ensuring that each reinforcing member 20 is fully stretched and of a straight shape so that each reinforcing member 20 will immediately resist deformation of the facing 2.

The position of the cross-section shown in FIG. 11 may be anywhere along the longitudinal extension of the airfoil shaped body 1, provided that a reinforcing member 20 is present at the chosen position. The sizes of elements shown in the cross-section may vary as a function of the longitudinal position of the cross-section. For example, a wind turbine blade typically tapers from the root of the blade towards the tip of the blade. Thus, the size of the cross-section decreases with decreased distance to the tip.

FIG. 13 schematically shows a cross-section of an airfoil shaped body 1 similar to the cross-section of FIG. 11, but in FIG. 12, the airfoil shaped body 1 has no girders and the reinforcing member 20 and the distance member 22 have been integrated into a single mechanical unit. The reinforcing member 20 has flanges bonded to the inner surface of the facing 2 at or near the respective edges of the cap part 6 of the facing 2. The distance member 22 also has a flange for abutment with the inner surface of the cap part 6 of the facing 2 that need not, but may, be bonded to the inner surface of the facing 2. Apart from this, the description of FIGS. 11 and 12 is also valid for FIG. 13.

FIG. 14 schematically shows a cross-section of an airfoil shaped body 1 similar to the cross-section of FIG. 11, but in FIG. 14, the airfoil shaped body 1 has a single girder 14 that also constitutes the distance member 22. The reinforcing member 20 is glued to the inner surface of the facing 2 at or near the respective edges of the cap part 6 of the facing 2. The girder 14 also constituting the distance member 22 has a flange that is bonded to the inner surface of the facing 2. The reinforcing member 20 is not fastened to the single girder 14. Instead, the girder 14 is provided with an opening or aperture 32, and the reinforcing member 20 extends through the opening 32 and rests against the girder 14 inside the opening 32. Apart from this, the description of FIGS. 11 and 12 is also valid for FIG. 14.

FIG. 15 schematically shows a cross-section of an airfoil shaped body 1 similar to the cross-section of FIG. 11, but in FIG. 15, the reinforcing member 20 and the girders 14 have common connections 24, 28 with the inner surface of the facing 2 at or near the respective edges of the cap part 6 of the facing 2, the facing 2 and the reinforcing member 20 and the girders 14 are bonded together at respective connections 24. Further, two similar expansion members 29 are positioned on opposite sides of the distance member 22 between the cap part 6 and the reinforcing member 20, each of which extends together with the reinforcing member 20 along the longitudinal extension of the airfoil shaped body and are filled with a filler material that expands for pre-tensioning of the reinforcing member 20. The filler material may for example comprise foam made of a mixture of polyurethane and isocyanate that expands upon mixing. Apart from this, the description of FIGS. 11 and 12 is also valid for FIG. 15.

FIG. 16 schematically shows a cross-section of a box profile 5 of an airfoil shaped body 1 with two reinforcing members 20, each of which is connected at one end to a respective distance member 22. The distance members 22 abut each other and are glued together back to back. Further, each of the reinforcing members 20 has a flange at the opposite end for connection to the inner surface of the cap part 6 of the box profile 5 by bonding. The girders 14 of the box profile 15 are of sandwich construction that are laminated to the cap part 6. Apart from this, the description of FIGS. 11 and 12 is also valid for FIG. 16.

FIG. 17 schematically shows a cross-section of an airfoil shaped body 1 similar to the cross-section of FIG. 11, but in FIG. 17, the reinforcing member 20 and the girders 14 have common connections 24, 28 with the inner surface of the facing 2 at or near the respective edges of the cap part 6 of the facing 2, the facing 2 and the reinforcing member 20 and the girders 14 are bonded together at respective connections 24. Apart from this, the description of FIGS. 11 and 12 is also valid for FIG. 17.

FIG. 18 schematically shows a cross-section of an airfoil shaped body 1 similar to the cross-section of FIG. 11, but in FIG. 18, the distance member 22 and the reinforcing member 20 have been integrated into a single mechanical unit. Further, the mechanical connections of the reinforcing member 20 to the girders 14 have been substituted with glued connections 24 proximate respective connections 28 of the girders 14 to the facing 2. The distance member 22 has a flange for abutment with the inner surface of the cap part 6 of the facing 2 that need not, but may, be bonded to the inner surface of the facing 2. Apart from this, the description of FIGS. 11 and 12 is also valid for FIG. 18.

FIG. 19 schematically shows a cross-section of an airfoil shaped body 1 similar to the cross-section of FIG. 11, but in FIG. 19, the distance member 22 and the reinforcing member 20 have been integrated into a single mechanical unit. Further, the mechanical connections of the reinforcing member 20 to the girders 14 have been substituted with bonded connections 24 proximate respective connections 28 of the girders 14 to the facing 2. The distance member 22 has a flange for abutment with the inner surface of the cap part 6 of the facing 2 that need not, but may, be bonded to the inner surface of the facing 2. Apart from this, the description of FIGS. 11 and 12 is also valid for FIG. 19.

FIG. 20 schematically shows a cross-section of an airfoil shaped body 1 similar to the cross-section of FIG. 11, but in FIG. 20, the distance member 22 is a cylindrical tube that is neither fastened to the inner surface of the facing 2 nor to the reinforcing member 20 so that the distance member can move or roll on the inner surface of the facing 2 in response to forces, such as crushing pressure, thereby minimizing deformation of the distance member 22 itself. The distance member 22 extends together with the reinforcing member 20 along the longitudinal extension of the airfoil shaped body, i.e. the number of distance members 22 preferably equals the number of reinforcing members 20; however, the number of distance members 22 may be fewer than the number of reinforcing members 20 so that each distance member 22 abuts a plurality of reinforcing members 20. Further, the mechanical connections of the reinforcing member 20 to the girders 14 have been substituted with bonded connections 24 to the facing 2 and bonded connections 28 to the girders 14. Apart from this, the description of FIGS. 11 and 12 is also valid for FIG. 20.

FIG. 21 is a schematic top view of a plate-shaped part of the reinforcing member 20 further comprising cut-outs 34 in the reinforcing member 20 distributed in a certain pattern. Respective connections 22, 24 of the reinforcing member 20 to the facing 2 and the distance member 22 are also indicated.

FIG. 22 shows in perspective a part of an airfoil shaped body 1 comprising a reinforcing member 20 that is plate-shaped between the distance member 22 and respective connections to the facing 2 and extends along substantially the entire longitudinal extension of the airfoil shaped body 1 together with the distance member 22. Thus, the reinforcing member 20 has the shape of a roof with two plate-shaped parts meeting at an apex at the distance member 22. The reinforcing member 20 resides between the inner surface of the facing 2 and respective girders 12 and is connected with continuous longitudinal connections 24 to the girders 14 and to the inner surface of the facing 2 at or near the respective edges of the cap part 6. Apart from this, the description of FIGS. 11 and 12 is also valid for FIG. 22.

FIG. 23 is a perspective schematic view of a separate reinforced cap part 6 that is individually manufactured before its assembly with the facing 2 and possible girders 14 of the airfoil shaped body 1. The separate cap part 6 is an individual member that is manufactured separate from the manufacture of the other parts of the airfoil shaped body 1 and subsequently assembled with the other parts of the airfoil shaped body 1. The separate reinforced cap part 6 comprises the distance member 22 and the reinforcing member 20 that is plate-shaped on each side of the distance member 22. The separate reinforced cap part 6 has an outer surface that is substantially flat or planar.

FIG. 24 is a perspective view of an airfoil shaped body 1 assembled with the separate cap part 6 shown in FIG. 23. Advantageously, the entire separate cap part 6, or a part of the separate cap part 6, can be renewed or replaced in case of failure of the existing cap part. The existing cap part may be removed by a suitable cutting procedure and a new fitting cap part 40 may then be bonded or otherwise connected to the existing airfoil shaped body 1. The outer surface of the cap part 6 may form the outer surface of the airfoil shaped body 1, or a new facing 2 may be provided in order to cover the region with the cap part, e.g. a region with a replaced cap part.

FIG. 25 schematically illustrates in perspective a separate reinforced cap part 6 that is individually manufactured before its assembly with the facing 2 and possible girders 14 of the airfoil shaped body 1 like the separate cap part shown in FIGS. 23 and 24. The top of FIG. 25 shows the cap part viewed from inside the airfoil shaped body, and the bottom of FIG. 25 shows the cap part viewed from outside the airfoil shaped body. The illustrated cap part 6 has a plurality of reinforcing members 20 formed by a wire 36 that is drawn or wound around the cap part 6 and the distance member 22. In order to maintain a smooth aerodynamic outer surface of the cap part 6, the wire 36 may have a small diameter or a cross-section with a flat shape. Further, the cap part 6 may have a recess for accommodation of the wire 36, and still further, the wire 36 may be covered by a laminate.

Preferably, the wire 36 forms an angle that is almost, but slightly different from, perpendicular to the longitudinal direction or extension of the airfoil shaped body 1 inside the internal volume of the airfoil shaped body 1 and on the outer surface of the cap part 6 due to the fact that the wire is wound around the cap part 6 with a simultaneous substantially constant velocity along the longitudinal extension of the cap part 6.

The wire 36 may be bonded to the outer surface of the cap part 6.

The wire 36 preferably comprises fibres of very high stiffness and strength such as, but not limited to, aramid fibres.

FIG. 26 schematically shows a cross-section of an airfoil shaped body 1 similar to the cross-section of FIG. 17, but in FIG. 26, the airfoil shaped body 1 has two distance members 22 in the shown cross-section, arranged with a mutual lateral distance. Apart from this, the description of FIGS. 11 and 12 is also valid for FIG. 26.

FIG. 27 schematically shows a cross-section of an airfoil shaped body 1 similar to the cross-section of FIG. 26, but in FIG. 27, the airfoil shaped body 1 has two reinforcing members 20 in the shown cross-section, each of which abuts a respective one of the distance members 22 and is connected to the facing 2 and a respective one of the girders 14 at one end, and to the other one of the respective distance members 22 and the facing 2 at its other end. Apart from this, the description of FIGS. 11 and 12 is also valid for FIG. 27.

FIG. 28 shows an airfoil shaped body 1 in the form of a wind turbine blade 1 for a horizontal axis wind turbine with three blades. A part of the facing 2 has been cut away for illustration purposes to make the plurality of reinforcing members 20 visible. The reinforcing members 20 are positioned along the longitudinal extension of the blade 1 from the root 13 to the tip 12 of the blade.

FIG. 29 shows in enlargement, the part of the blade 1 of FIG. 28 with the cut away facing 2 to show in more detail the arrangement of the plurality of reinforcing members 20. FIG. 17 shows one of the reinforcing members 20 in more detail, and thus the description of FIG. 17, including the description of FIGS. 11 and 12, is also valid for FIG. 29.

FIG. 30 shows in enlargement, the part of another blade 1 similar to the blade shown in FIGS. 28 and 29; however with a different arrangement of a plurality of reinforcing members 20 wherein each reinforcing member 20 extends from the distance member 22 to the inner surface of the facing 2 at one side of the distance member 22, and wherein the reinforcing members are arranged in spatial relationship along the longitudinal extension of the blade 1 in such a way that neighbouring reinforcing members are attached to the inner surface of the facing 2 at opposite sides of the distance member 22. Apart from this, the description of FIGS. 28 and 29, including the description of FIGS. 11 and 12, is also valid for FIG. 30.

FIG. 31 schematically shows a cross-section of an airfoil shaped body 1, in which one or more reinforcing members 20 have been arranged for reinforcing a trailing and substantially flat part of the facing 2 between the trailing edge 4 and the rearmost girder 14 at the suction side of the airfoil shaped body 1. Apart from this, the description of FIGS. 11-30 is also valid for FIG. 31.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. An airfoil shaped body with a leading edge and a trailing edge extending along a longitudinal direction of the airfoil shaped body and defining a profile chord, the airfoil shaped body having a suction side and a pressure side, both of which extend between the leading edge and the trailing edge, the airfoil shaped body comprising:
    an airfoil shaped facing that forms an outer surface of the airfoil shaped body and surrounds an internal volume of the airfoil shaped body,
    at least one reinforcing member that is connected to the airfoil shaped facing with a first connection inside the internal volume only adjacent a first side of the airfoil shaped body, the first side being one of the suction side and the pressure side, and extends transversal to the longitudinal direction of the airfoil shaped body; and
    a distance member that is in contact with airfoil shaped facing, at a substantially flat part of the airfoil shaped facing inside the internal volume of the airfoil shaped body at a same side of the profile chord as the first connection, and at a lateral distance from the first connection and extends from the airfoil shaped facing and into the internal volume of the body, wherein
    the at least one reinforcing member is in contact with the distance member at a second connection at a distance from the airfoil shaped facing inside the internal volume of and only adjacent the first side of the airfoil shaped body and operates in tension for reinforcing the airfoil shaped facing against inward deflections, and
    the at least one reinforcing member is further connected to the airfoil shaped facing with a third connection only adjacent the first side of the airfoil shaped body and at a side of the distance member opposite the first connection and on a same side of the profile chord as the connection of the distance member to the airfoil shaped facing.

2. An airfoil shaped body according to claim 1, wherein one of the at least one reinforcing member is connected to the airfoil shaped facing with the first connection and another one of the at least one reinforcing member is connected to the airfoil shaped facing with the third connection and is displaced along the longitudinal direction of the airfoil shaped body with relation to the one of the at least one reinforcing member with the first connection.

3. An airfoil shaped body according to claim 1, wherein the at least one reinforcing member comprises a plurality of elongated reinforcing members extending transversal to the longitudinal direction of the airfoil shaped body and positioned in spaced relationship along the longitudinal extension of the airfoil shaped body.

4. An airfoil shaped body according to claim 1, wherein the at least one reinforcing member is selected from the group of a wire, a rope, a thread, a fiber, and a web of fabric.

5. An airfoil shaped body according to claim 1, wherein the at least one reinforcing member also operates in compression for reinforcing the airfoil shaped facing against inward deflections.

6. An airfoil shaped body according to claim 5, wherein the at least one reinforcing member has the shape of an element selected from the group of a rod, a bar, a plate, a tube.

7. An airfoil shaped body according to claim 1, further comprising a girder extending inside the airfoil shaped body and along the longitudinal direction of the airfoil shaped body and that is connected to the airfoil shaped facing, and wherein the distance member forms part of the girder.

8. An airfoil shaped body according to claim 1, wherein a part of the airfoil shaped facing constitutes the distance member.

9. An airfoil shaped body according to claim 1, further comprising two girders extending inside the airfoil shaped body and along the longitudinal direction of the body and with a mutual distance perpendicular to the longitudinal direction of the body and that are connected to the airfoil shaped facing, and wherein
    the distance member is located between the two girders, and wherein
    the at least one reinforcing member is connected to the airfoil shaped facing proximate respective connections of the girders to the airfoil shaped facing.

10. An airfoil shaped body according to claim 1, wherein the distance member is formed by a plurality of distance members.

11. An airfoil shaped body according to claim 1, wherein a space between the at least one reinforcing member and the airfoil shaped facing is at least partly filled with a filler material.

12. An airfoil shaped body according to claim 1, wherein the at least one reinforcing member and a part of the airfoil shaped facing constitute a cap part.

13. A wind turbine with a blade that is an airfoil shaped body according to claim 1.

14. An aircraft with a wing that is an airfoil shaped body according to claim 1.

15. A method for manufacturing an airfoil shaped body, the airfoil shaped body having a leading edge and a trailing edge extending along a longitudinal direction of the airfoil shaped body and defining a profile chord, the method comprising:
    providing at least a part of an airfoil shaped facing of the airfoil shaped body,
    providing a distance member,
    contacting the distance member to an internal surface of the airfoil shaped facing,
    providing at least one reinforcing member,
    connecting the at least one reinforcing member to a first position at the internal surface of the airfoil shaped facing at a distance from the distance member and at the same side of the profile chord as the contact of the distance member with the airfoil shaped facing and only adjacent a first side of the airfoil shaped body, the first side being one of a suction side and a pressure side, contacting the at least one reinforcing member to the distance member at a distance from the airfoil shaped facing only adjacent the first side of the airfoil shaped body, and connecting the at least one reinforcing member to a second position at the internal surface of the airfoil shaped facing at a distance from the distance member and at a side of the distance member opposite from the first position and at a same side of the profile chord as the contact of the distance member with the airfoil shaped facing and only adjacent the first side of the airfoil shaped body.

16. A method according to claim 15, further comprising: pre-tensioning the at least one reinforcing member with a desired amount of tension.

17. A method according to claim 15, further comprising: providing a filler material in a space between the at least one reinforcing member and the internal surface of the airfoil shaped facing.

18. A method according to claim 15, further comprising: providing at least one girder and connecting the girder to the internal surface of the airfoil shaped facing.

19. A method according to any of claim 15, wherein at least one of providing at least a part of an airfoil shaped facing, providing a distance member, and providing at least one reinforcing member includes building up layers of fiber materials.

* * * * *